United States Patent [19]
Wespi

[11] 3,797,176
[45] Mar. 19, 1974

[54] DUAL-CYCLE CAM GRINDING MACHINE WITH ELECTRICAL PULSE OPERATED WHEEL FEED

[75] Inventor: George E. Wespi, Holden, Mass.

[73] Assignee: The Warner & Swasey Company, Cleveland, Ohio

[22] Filed: Jan. 17, 1972

[21] Appl. No.: 218,359

Related U.S. Application Data

[63] Continuation-in-part of Ser. No. 60,288, Aug. 3, 1970, Pat. No. 3,701,220.

[52] U.S. Cl............ 51/101 R, 51/165.77, 51/165.91
[51] Int. Cl............................................ B24b 19/12
[58] Field of Search......... 51/101 R, 165 R, 165.77, 51/165.91

[56] References Cited
UNITED STATES PATENTS
3,622,287  11/1971  Kurimotor.......................... 51/165 R
3,665,652  5/1972  Gordon............................. 51/165.77
3,683,558  8/1972  Oishi................................ 51/101 R

*Primary Examiner*—Harold D. Whitehead

[57] ABSTRACT

Improved dual-cycle camshaft grinding machine, method of operation thereof, and improved wheel feed control sub-assembly therefor with a grinding wheel feed driven by an electro-hydraulic pulse motor regulated by open loop numerical control. Solid state machine logic regulates the initiation of open loop wheel feeding steps and controls related machine functions. Hand control for purposes of calibration setup is accomplished through the automatic controls eliminating the redundant handwheel and like manual controls of the art.

11 Claims, 15 Drawing Figures

DUAL-CYCLE CAM GRINDING MACHINE WITH ELECTRICAL PULSE OPERATED WHEEL FEED

The present invention is an improved camshaft grinding machine and method of camshaft grinding. This application is a continuation-in-part of my copending application Ser. No. 60,228 filed Aug. 3, 1970 titled "ELECTRIC FEED FOR MACHINE ELEMENT" now U.S. Pat. No. 3,701,220.

BACKGROUND OF THE INVENTION

Camshaft grinding machines have been used by the automobile industry and related industries for almost half a century. These machines have it in common that a camshaft blank is mounted in line with a master cam assembly and a grinding wheel is fed into the camshaft blank to grind various cam positions thereon to the desired cam configurations. The master cam and camshaft blank rotate together with the master cam rotating against a fixed follower causing displacement of the camshaft blank so that the desired cam surface is generated by a circular grinding wheel. The state of this art is exemplified by U.S. Pat. No. 2,786,311 to Hill et al. granted Mar. 26, 1957 and in subsequent improvements made to such apparatus including a double stop mechanism to afford dual cycle capability. As can be seen in the Hill patent, the camshaft blank — master cam assembly is mounted on a rocker bar which pivots the assembly to and from the grinding wheel and includes a pivoted position wholly away from the grinding wheel to allow longitudinal displacement from one cam to the next without interference by the grinding wheel or master cam follower. The grinding wheel is fed into the cam when grinding, retracted to a starting point, and fed in again. The grinding cycle consists of a rough cycle with high wheel feed speeds and a finish grinding cycle with a slower feed rate to finish off a given cam surface. The rough grinding steps are done on all cams first and then the finish grinding steps are done on all cams.

Closed loop controls are commonly used in connection with wheel feed, with positive mechanical stops arresting in-feed movement of a grinding wheel into the work, the stop or stops being set according to the amount of stock to be removed from the cam shape being ground. Open loop counter controls are utilized in connection with work rotation schedules in camshaft grinding machines and have been used in connection with wheel feed schedules in some grinding machines but not in wheel feed control for camshaft grinding machines.

The relative advantages and disadvantages of open loop control and closed loop control are well known as a matter of general automatic control theory. The open loop system affords greater protection against the danger of instability development; it can generally be tuned with greater accuracy than a closed loop feedback control (such as the mechanical stop noted above); and can, in some cases, be less sensitive to variations arising from changing ambient conditions, machine wear, etc. Implementation of open loop feedback control of wheel feed in camshaft machines is however made difficult by the inability of the art to deal with the problems of loss of input counts of wheel feed. There has been no practical way, short of superimposing a closed loop system on the open loop system to deal with the problem. Another problem is that of overlooking a preset wheel feed stop reference due to noise and other causes. External limit switches and the like prevent a disastrous accident when this occurs, but the work is spoiled.

The continuing development of such machine tools, has been paralleled by the continuing requirement for controlled displacement of movably mounted machine elements, and especially for satisfactory means of feeding and retracting the movably mounted elements of machine tools which support various forms of cutting tool elements, such as grinding wheels incorporated in various types of cylindrical grinders such as the grinding machine described and illustrated in the above cited Hill et al. patent as well as in Hill U.S. Pat. No. 3,171,234 and in machines which comprise multiple grinding wheels arranged to grind crankshaft main bearings, and the grinding machine as described and illustrated in Mader, U.S. Pat. No. 2,723,503, including workpiece supports arranged to support a crankshaft for grinding its crankpin bearings.

Comstock U.S. Pat. No. 2,867,759, describes a grinding machine in which the grinding wheel feed includes a feed screw rotated by a servo-motor actuated by an electrically operated precision control and position indicating system, and Morgan, Jr. et al, U.S. Pat. No. 3,056,240 describes several features of an automatic grinding machine, among them a wheel feed including an hydraulic paddle motor to provide a fixed rapid feed and an hydraulic rotary motor the speed and direction of rotation of which are determined by operation of an electro-hydraulic servo-valve controlled from a control station provided with a hand wheel either manually rotated for manual control of wheel head movement, or rotated by a control motor in automatic grinding cycles.

Eyler, U.S. Pat. No. 3,121,831, describes an automatic control system for positioning a movable member comprising a null-balance system including first and second differential transformers, a drive motor and a pilot motor all so inter-connected operation of the pilot motor displaces the elements of the first differential transformer from their null position as it operates to restore the elements of the second differential transformer to their null position, producing an incremented feed, also operates to displace the elements of the second differential transformer from their null position to initiate another incremental feeding movement.

Dunn, U.S. Pat. No. 3,309,820, describes a grinding machine equipped with opposed grinding disks, each mounted for feeding movement toward, and retraction from, a workpiece grinding position by a feed mechanism including an electric stepping motor actuated by a stepping switch and an electrical control semi-automatically operative to produce a number of incremental feeding movements determined by the setting of an adjustable counter relay, and alternatively manually operable to produce repeated incremental movements.

In addition to the electrically operated and/or actuated feed mechanisms described in the several prior patents referred to above, Price, U.S. Pat. No. 3,466,976, describes a cylindrical grinding machine equipped with a well-known type of wheel feed mechanism including a feed screw and actuating means therefore to produce successively a rapid feed, a grinding feed, and a fine finish feed, and also includes accessory apparatus for positioning the feed screw to grind workpiece sections of different diameters, which includes an electrically operated rotary hydraulic motor and an electric brake coupled to the opposite ends of a common shaft and thence through a rotary coupling and a shaft connected to the actuating means for producing fine finish feed by rotation of the feed screw.

Fries et al., U.S. Pat. No. 3,192,675, and patents cited therein, describe a grinding wheel feed and indicator for grinding machines. Luebkemann, U.S. Pat. No. 3,193,976 and patents therein cited, describes a grinding wheel feed system using a Nixie tube digital read-out display pulse counter, synchronized with pulse counts generated by wheel feeding operation, to show actual position of the wheel.

OBJECTS OF THE INVENTION

It is the principal object of the invention to provide an improved machine of a class described affording a greater freedom from the need for operator monitoring — or to put it another way, allowing one operator to control more machines — and affording high reliability and higher production rate.

It is a further object of the invention to provide a machine with fewer mechanical parts consistent with the foregoing object.

It is a further object of the invention to integrate automatic and manual control systems in machines of the class described — with necessary or desirable manual controlled operations for calibration, one-time or master machining, synchronizing, test, etc., carried out using the automatic control equipment to eliminate redundant manual drives and linkages — consistent with the foregoing objects.

It is a further object of the invention to provide apparatus allowing open loop automatic timing control of machines of the class described.

GENERAL SUMMARY OF THE INVENTION

In accordance with the present invention, the foregoing objects are met by an improved dual cycle camshaft grinding machine in which the wheel feed mechanism of the machine is driven along a lead screw which is rotated by an electro-hydraulic pulse motor, comprising a servo valve driven by an electric stepping motor to control flow of fluid to a hydraulic motor, which provides th motive power for the grinding wheel feed. An electric pulse generator provides driving pulses of selected frequency and period to the stepping motor under control of digital control elements including a counter control and a solid state machine logic control portion which responds to feedback signals from the apparatus, indicative of cycle state, and manually fed and preset cycle limits for initiating wheel feed and counting, but utilizes open loop numerical control for ending wheel feed (and counting) steps to the extent necessary to remove the desired amount of stock from the camshaft blank. Alternatively, the feed may be manually controlled through the same mechanical apparatus.

The related machine functions, including wheel retraction, loading/unloading work table positioning, work orientation positioning, cam indexing, etc., are also controlled by the digital control equipment whether on automatic cycling or in manually initiated steps. A camshaft grinding machine utilizing the above described apparatus affords semi-automated precision grinding, consistent with simplicity and reliability of operation, and allows a reduction in the amount of operator time necessary to monitor machine operation. Such a machine also affords faster production cycles through the elimination of unnecessary wheel retraction motions and optimum rough and finished grinding feed cycling, consistent with reliability. Calibration and setup is accomplished through use of the automatic control equipment in a manual control mode without need for additional expensive hand controls such as a hand wheel feed or the like. Compensation is provided for ambient and wear induced shifts of operating equipment through gaging of the workpieces allowing substantial freedom from the need for operator monitoring. This compensation is accomplished through a post grind size gaging of a cam base circle in comparison to a preset reference.

A transducer generates pulses as a derivative function of hydraulic servo valve operation which, in turn, is a function of original electrical input pulses and compares them to derive an error signal reflecting loss of synchronism.

DESCRIPTION OF THE PREFERRED EMBODIMENT

Figure 1:
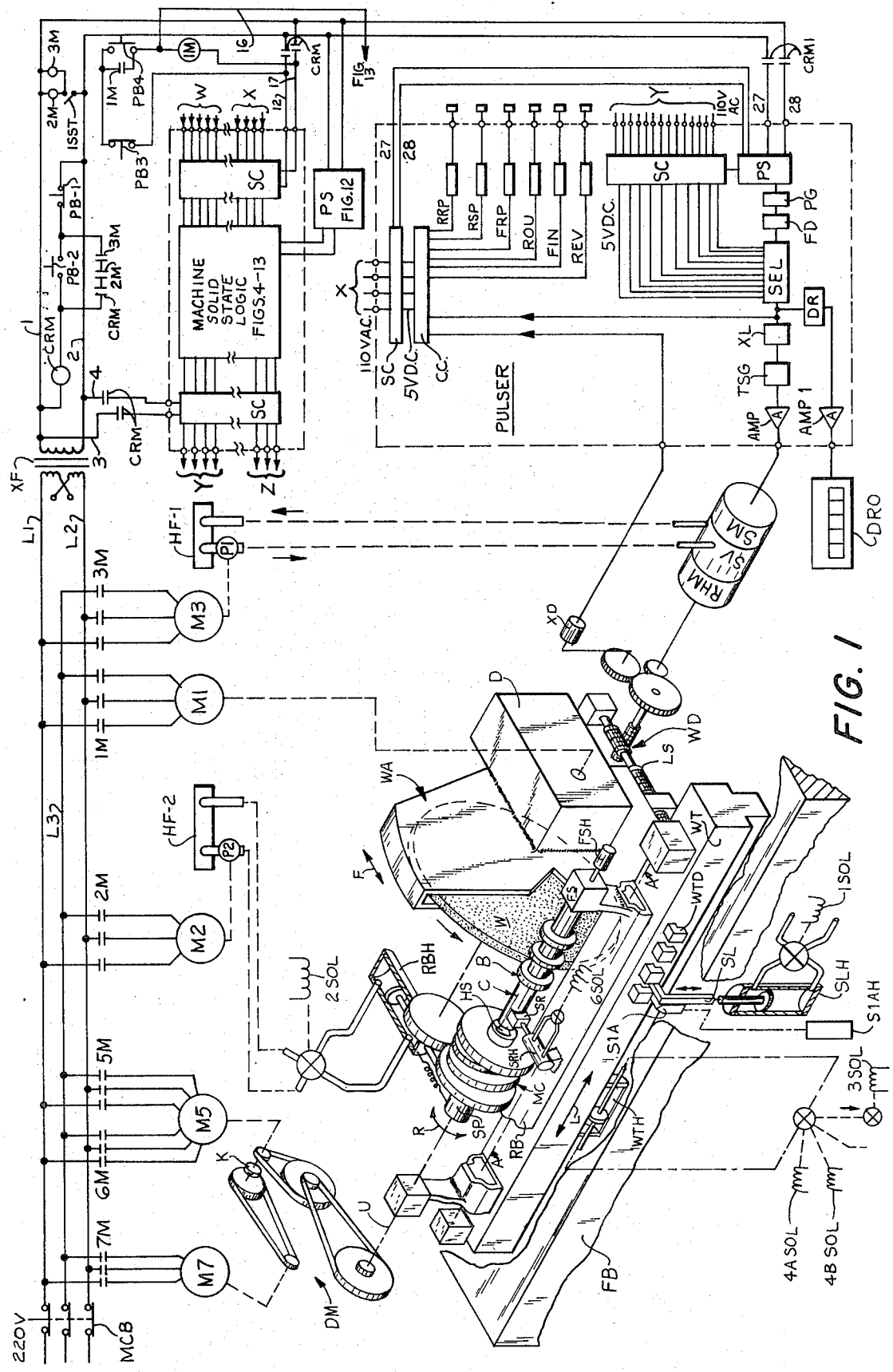
FIG. 1 is an isometric sketch of the essential portions of a preferred embodiment of the improved machine of the invention, including an electrical and hydraulic schematic diagram portions showing the various drives for machine elements.

Referring to FIG. 1, there is shown a master camcamshaft assembly C mounted to rotate together. A grinding wheel assembly WA including a grinding wheel W is fed into the cams spaced along the camshaft or retracted therefrom as indicated by the double-headed arrow F. The master cam-camshaft assembly can be rotated as indicated by double-headed arrow R about an axis A passing through a rocker bar RB which is pivotably mounted on a worktable WT which is longitudinally movable back and forth on a fixed base FB in a direction as indicated by the double-headed arrow L. The grinding wheel assembly includes a motor M-1 and a drive D mounted to be fed in with the grinding wheel. The feed of the grinding wheel is accomplished through a grinding wheel lead screw LS which is driven by the pulse operated rotary hydraulic motor RHM. The hydraulic motor is connected to a source and sink of hydraulic fluid HF-1 by a servo valve SV. The servo valve is driven by a stepping motor SM. A pulse generator PG provides pulses of a selected frequency which is converted to usable frequencies by a frequency divider FD. A gating digital selector control SEL then feeds a selected frequency train of the pulses to a translator (electronic switch) XL which in turn feeds the pulses to the stepping motor via a stepping motor driver circuit which comprises a 10-state generator TSG and amplifier AMP. A rotary transducer XD is provided on, or geared to, the grinding wheel lead screw to count the number of turns of the shaft of rotary motor RHM and feed a signal to a coincidence counter circuit CC which is also connected to the output of the digital controller for comparison via a position verification (nulling) circuit contained in the coincidence counter circuit to generate an error signal, if applicable.

The master cam-camshaft assembly C comprises a master cam array MC mounted on a spindle SP and a headstock center HS for mounting the camshaft blank B. The rocker bar RB has a footstock FS, with a footstock center, for mounting the other end of the camshaft blank.

A universal drive-shaft connection U transmits power from motors M-5 or M-7 to the master camshaft assembly C via a Vee belt drive mechanism DM when the rocking bar has rotated the assembly C to a work position, yet allows pivoting of the rocking bar back to a loading/unloading position also mounted on the rocking bar RB is a steady rest SR which bears against the camshaft during grinding.

Motor M5 drives the shaft U during rough grind and finish grind cycles at speeds determined by contacts 5M and 6M, respectively, through the belt drive. During slow finish grinding with wheel feed stopped, as described below, motor M-7 drives shaft U via one-way clutch K. In the rough and finish grind cycles, the clutch lets M-5 override M-7.

Initiation and cut-off of operation of electric motors and hydraulic motors shown in FIG. 1 is controlled by circuit breakers as follows:

| MOTOR | CIRCUIT BREAKER |
|---|---|
| M-7 | 1M |
| M-5 | 6M and 5M |
| M-2 | 2M |
| M-1 | 1M |
| M-3 | 3M |

An oil cooling motor (not shown) and similar switching are also provided.

The above switches are controlled by corresponding relay operators (shown as circles) 1M, 2M, etc. and a set of master circuit breaker contacts and corresponding generator are both indicated as CRM.

Standard three phase 220 volt, 60 cycle, factory line voltage is fed in at power lines L1, L2, L3 and the above motors are connected to these lines. The voltage is stepped down to 110 volts, single phase, 60 cycle at lines 1, 2 by transformer XF and tapped at lines 3, 4 and at lines 12, 17 all under control of master relay CRM to provide power to power supply-signal conversion units at PS which are associated with the solid state controls as described below.

Conventional safety interlocking is provided for the various circuit breaker operators, CRM, 1M, 2M, etc., in well known fashion to prevent disastrous modes of machine operation.

With main circuit breakers MCB contacting to give line voltage (as indicated by a lamp, not shown) the operator pushes button PB-2 to operate CRM which closes switch 1SST and, after release of PB-2, CRM will stay closed since contacts 2M and 3M have been closed through closure of switch 1SST to assure adequate fluid pressure (via operation of motors M2 and M3) to operate the various hydraulic pumps P1 and P2.

A master stop push-button switch is provided at PB-1 and grinding wheel start and stop switches are provided by PB4 and PB3 respectively.

Additional interlocks (not shown) are provided to limit operation in response to hydraulic or coolant lubricant fluid pressure, temperature, etc., in similar fashion.

The electrical pulses from the pulse generator are also fed to a digital readout numerical display device DRO via a driver circuit DR and an amplifier AMP1.

The electrical pulses are also fed to a counter control circuit C.C. which also has manual adjustment mechanisms for setting limits as follows:

| RRP | Rough reset preset count. |
| RSP | Rough size preset count |
| FRP | Finish reset preset count | and wheel feed and retraction rates as follows:

| ROU | Rough grind wheel feed rate |
| FIN | Finish grind wheel feed rate |
| REV | Wheel retraction rate |

The FSP(-finish size preset)position is hard wired.

Figure 3:
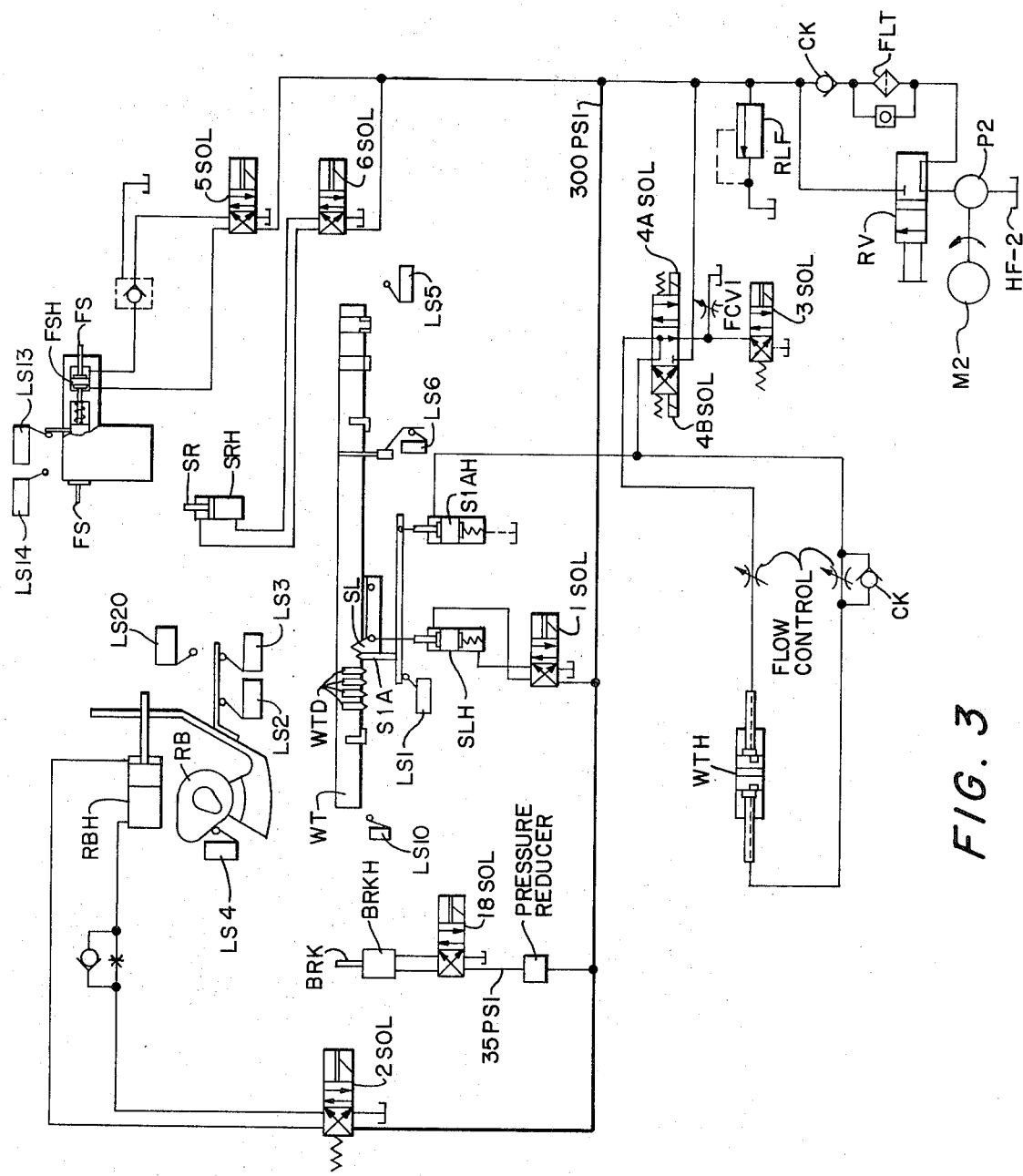
FIG. 3 is a schematic outline diagram of the hydraulic drives and controls of the machine.

Referring now to FIG. 3 with cross-reference to FIG. 1 for mechanical arrangements of parts of the FIG. 3 diagram, there is shown an hydraulic diagram of the fluid powered portions of the machine and related hydraulic controls. The working fluid for all hydraulic operators, excepting wheel feed, is contained in a hydraulic tank HF-2 (350 pounds per square inch pressure, 30 gallons capacity) which is drawn by a 5 gallon per minute pump P2 driven by motor M-2 (3HP, 1,200 rpm). The fluid is pumped past conventional filter, rotary valve, check valve, and relief valve structure FLT RV, CK and RLF respectively, and then to a metering device (not shown) for distribution to low pressure drives. High pressure is fed directly to table cylinder WTH via a valve controlled by solenoids 4BSOL and 4ASOL. High pressure is also fed directly to the rocking bar cylinder RBH under control of solenoid valve 2SOL.

Table movement is controlled through fluid pressure at hydraulic motors SLG and S1AH which provide work table indexing and reversing. This is done through the raising and lowering of the table stop lug SL driven by cylinder SLH under control of solenoid valve 1SOL.

Table cushioning is provided for indexing and reversing by solenoid 3SOL which closes when cushioning is needed to divert fluid exhaust from table cylinder WTH though metering valve FCV1 which slows down the exhaust to afford hydraulic cushioning.

S1A is an actuating probe for limit switch LS1. The probe is depressed by work table dogs WTD during indexing to make circuit switch (which electrically resets 3SOL, along with outher functions described below). During table reversal, pressure to cylinder S1AH causes lowering of probe S1A. Limit switch LS1 is continuously made. Solenoid 3SOL is deenergized and there is thus free hydraulic exhaust during table reversal.

The FIG. 1 outline also indicates a series of input connections Y from the solid state logic control which controls auxiliary work positioning functions of the machine (including table position, work rotation) to the pulser which controls termination of wheel feed. These input signals initiate the wheel feed in proper sequential relation to related work positioning functions.

Inputs from the coincidence counter to the logic are indicated at X, these signals being utilized only in case of a loss of effective wheel feed function as described below. Inputs from the machine to the logic (push button, limit switch signals, and the like) are indicated at W. Outputs from the logic to the machine (e.g., to energize solenoids) are indicated at Z.

Electric Control Systems — Machine Solid State Logic

FIGS. 4–11 show machine solid state logic portions providing the control functions referred to in connection with the preceding general and hydraulic component operating descriptions.

In these drawings reference vertical grids A1, B4, B5, etc., are provided and cross-overs from one logic section to another are indicated by these letters. For instance in section A of FIG. 4, a wire ends with the notation that it connects to a wire in section F1 in FIG. 7 and in FIG. 7 a corresponding notation is found.

Referring back to FIG. 1, it will be recalled that wires 12, 17 afford power for input devices of the machine solid state logic and that wires 3, 4 afford power for the machine solid state logic output devices.

Figure 12:
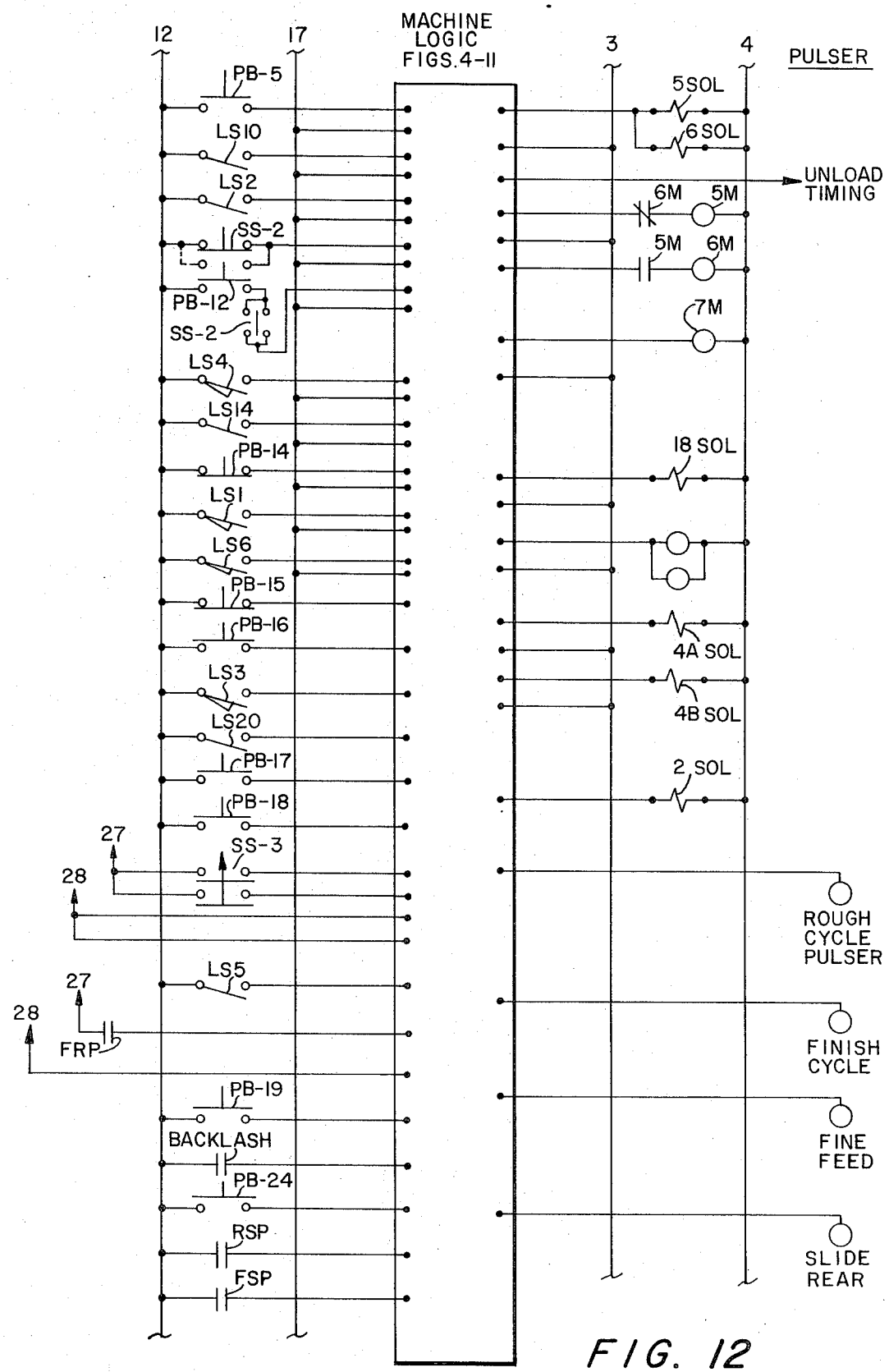
FIG. 12 is a schematic system diagram of the whole FIG. 4–11 array for convenient viewing of all inputs and outputs together.

FIG. 12 shows a block diagram of the inputs and outputs of the machine logic serially arranged. FIG. 12 should be viewed together with FIGS. 1 and 3 to understand the interrelationship of electrical or electromechanical sensors and actuators with hydraulic actuators and the machine logic section. The following operating descriptions can be read in conjunction with these systems diagrams before turning to the detailed component apparatus and mode of operation description given in connection with FIGS. 4–14.

The drawings of FIGS. 4–13 are, in the main, electrical circuit diagrams. However, certain inputs are simply indicated by legend rather than showing the electrical input device (e.g., the source of a cycle start signal in section A1 is indicated by legend).

The components are all standard module AND or OR gates and signal convertors indicated by the model numbers with performance specifications currently available in catalogs of the Digital Equipment Corporation of Maynard, Mass., but well known per se in the art and available from other manufacturers as well.

In some cases standard modules are ganged by connecting wires, such as A01, B01, C01, etc. Typical signal convertors are modules K578 (120V. a.c. input convertor utilizing triac maintained contact convertor), K615 (isolated a.c. switch), K134 inverter. Typical AND gates are K123, K003 (AND gate expander). K026 is a typical OR gate. K303 is a solid state timer.

Those standard module references are not repeated substantially after the first section since like symbols in the same relative places in the later sections indicate that the same module selection is made.

Letters D, F, H, N, etc., at terminals of the logic gates are used to indicate Boolean states — e.g., D high or low, on or off, 0 or 1 — generally referred to as 0 or 1 for D and each other terminal for purposes of explaining component operation below.

The push-buttons, limit switches and relays from the machine systems of FIGS. 1 and 3 and timer contacts from the pulser of FIGS. 1 and FIGS. 4–13 below all provide inputs and outputs connected, respectively, between power lines 12 and 17 and lines 3 and 4 (note FIG. 1 for their power supply connections). Switches have the conventional notations in table below that NO means normally open, NC means normally closed and HC means held closed.

Details of the pulser are not shown since these, per se, form no part of the invention beyond the relation of the performance specifications therefor as set out herein in relation to the machine system assembly and control system sub-assembly therefor set out herein. The pulser as a whole is obtainable from several suppliers including the Dynapar Company of Gurnee, Ill. The necessary pulser inputs and outputs are shown in FIGS. 4–13 as contacts, which are connected across the machine solid state logic shown in the centers running vertically down FIGS. 4–11, 12 and 13.

Each step motor pulse moves the wheel slide assembly WA 0.0001 inches affording a stock removal of 0.0002 inches (on a diameter basis) on the display. The rough grind feeding rate is adjustable from 0 to 1,999 pulses per second (0–12 inches per minute advance) and the finish grinding feed rate is adjustable from 0 to 99 pulses per second (0–0.6 inches per minute). As shown in FIG. 1 these settings are made by manual settings at the counter control. The slide return rate of assembly WA is fixed at 2,000 pulses per second (12 inches per minute). Provision is made for manually "picking" the wheel assembly forward in 0.0001 inch (one pulse) increments. The pick increments do not register on the counting means of the pulser and do not appear on display DRO.

Failure of the motor RHM to follow command pulses of the pulser is detected by rotary transducer XD, preferably set to give an error signal at the circuit C.C. whenever a loss of synchronism in excess of plus or minus 80 counts (± 0.008 inches) occurs.

The plus or minus 80 counts following limit does not reflect an absolute synchronism error, but rather includes an allowance for time lag between electrical pulse increment accumulation generated by the pulser and electrical pulse increment accumulation generated by the rotary transducer as a function of mechanical output shaft motion. Upon termination of electrical output, the mechanical output shaft, and hence transducer generated pulses, can catch up.

At each preset station described above — i.e., RSP, RRP, FRP, FSP — total pulses of the transducer and pulser are compared (after a time delay to allow catchup) and if there is a difference greater than plus or minus eight counts a positional error signal is generated.

The error signal generated in either the following or positional modes is preferably utilized to swtch the machine from automatic into hand mode and/or to generate a visual indication of the error (or audible alarm).

The digital read-out display DRO provides a continuous indication of distance of the wheel from a hardwired preset zero which, after setup as described below, corresponds to FSP. During grinding the DRO is thus showing the amount of stock which remains to be removed from the camshaft blank surface.

The pulser may also include wheel wear compensator presets activated each time wheel truing is scheduled or occurs to shift the reset preset end limits by an amount corresponding to the known wheel radius reduction produced by truing.

The above described electric-hydraulic pulse motor subassembly comprising RHM, SV, HF-1, M-3, P1, could be replaced by a high torque stepping motor, such as the Fujitsu model EPN-110B electrical stepping motor, operating directly on the mechanical drive train for the wheel feed. In such case, the following lag between the pulser and transducer XD would be less than for the above described embodiment.

Operation

Operation is initially described in terms of the machine system as a whole, then redescribed in terms of specific component functions.

Basic Automatic Dual Cycle Wheel Feed

Figure 2:
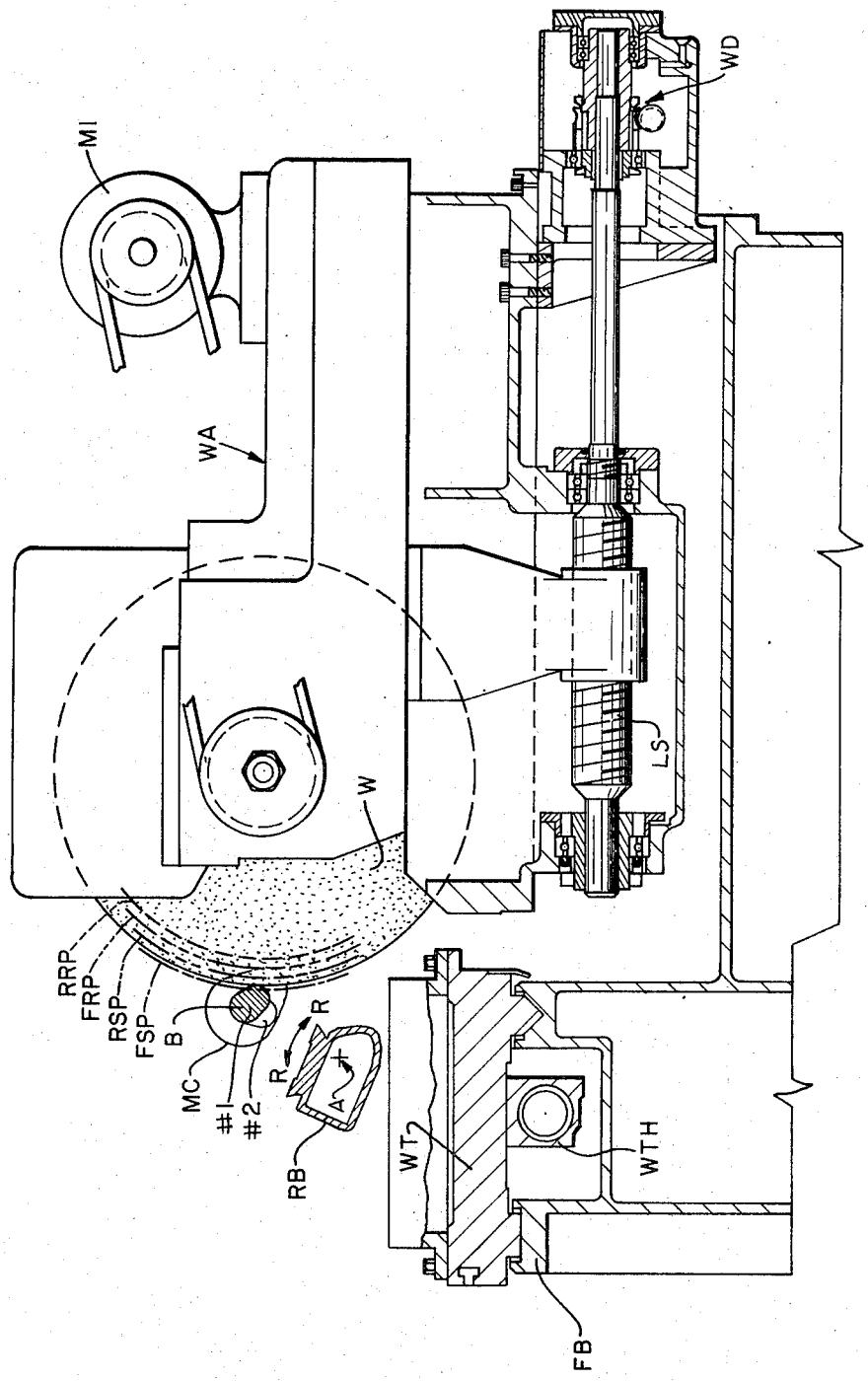
FIG. 2 is a diagram of grinding wheel feed limiting positions and a side view of the wheel feed assembly.

In accordance with the conventional practice, the grinding wheel is fed in to do a rough grinding cycle on each cam, with the table indexing longitudinally between rough grinding cycles on each cam to present the next cam for rough grinding. Referring now to FIG. 2, the grinding wheel is shown with respect to the camshaft at a moment in time when it is in the process of finishing cam number one (No. 1) of a series of cams on the camshafts. Limiting positions of the grinding wheel are indicated by chain lines and the dimension lines RRP, FRP, RSP, FSP. The wheel starts out with its leading edge at position RRP — the rough reset preset position. The wheel is advanced in to accomplish rough grinding reaching rough size RSP preset position at the completion of rough grinding. The wheel then backs off to rough reset preset. The cams are longitudinally indexed and the wheel then moves in to rough grind the next cam, etc. After completion of rough grinding of all the cams, the wheel is backed off to the finished reset preset position FRP. It advances to the finish size preset position FSP to finish the cam, then after die-out (described below), backs off to FRP again and as the table is indexed, moves in to finish the next cam, etc. At the moment shown in the drawings cam number two (No. 2) which is seen behind cam number one has been rough ground and will be next in turn for finished grinding. For purposes of setting up the controls, the position FSP is generally taken as a zero position. The RSP an FRP position controls are adjustable between 0.0000 and 0.9998 inches and the RRP position is adjustable between 0.0000 and 0.9998 inches, in increments of 0.0001. A typical set of controlled dimensions is that the distance from FSP to RSP will be 0.007 inches, the distance from FSP to FRP will be 0.022 inches and the distance from FSP to RRP will be 0.150 inches. Typically, the wheel is a 24 inch diameter wheel of vitrified bond type (e.g., model 51A60M-VBEX113C of Norton Company). Its speed is 12,000 surface feet per minute, achieved by rotation of 1,900 revolutions per minute. The feed rate for the wheel during rough grinding is typically 1.2 inches per minute and during finish grinding is fifty thousandths (0.050) of an inch per minute. The rough grind wheel feed rate is adjustable between zero and 12 inches per minute and the finish grind wheel feed rate is adjustable between zero and 0.6 inches per minute.

At the end of each finish grinding cycle for each cam, the wheel does not immediately retract but with wheel feed stopped (i.e., feed rate equals zero inches per minute), the work has six die out turns with an initial three turns at a fast finish rate of 75 revolutions per minute and three turns at a slow finish rate of 38 revolutions per minute while the wheel continues at full speed.

After rough grinding all the cams of a given shaft, the wheel is returned to finish reset preset position for dressing by a dressing tool. Then all of the cams are finish ground in a cycling similar to that of rough cycling except that movement of the wheel is forward from point FRP to FSP during grinding and retracted from FSP to FRP between grinding operations and allowing the work table to index. After all finishing is completed, the wheel goes back to its rough reset position RRP where it is dressed while the table goes to a load position. The finished camshaft is unloaded. A new rough camshaft is put in and cycling is repeated as just described with the exception that the initial calibration movement is not necessary. Automatic controls are also provided in connection with the loading and moving of the table to the beginning of roughing. The automatic control also controls the rocking bar to move it to and from working position during all of the above described grinding wheel cycling, controls table indexing and also controls truing and lubrication operations and work rotation.

During the basic cycling described above, the wheel feed and work rotation counters control timing of the various steps of operation. During rough grinding the pulse counter counts down to when it coincides with RSP and sends a wheel retraction index signal. During finish grinding, machine logic initiates the pulse counter. The pulse counter counts down to zero, which is FSP, then sends a signal to activate the work rotation controller which counts out the die-out turns, then signals for wheel retract and table index. When the last cam is finished, the wheel is returned to RRP through an operating signal initiated by a position sensing limit switch via the machine logic hereinafter described.

Backlash takeup during finish grinding is accomplished at rough grind feed rates. Provision is made in the finish cycle counting apparatus and feed rate controls to count out a number of pulses while running at rough grinding feed rate (generally to take up about 0.015 inch backlash or greater or less backlash associated with a particular machine; the backlash is measured and the allowance is preset).

Initial Calibration Operation

When beginning to machine the series of camshaft blanks the operator sets up the master cam spindle, measures some of the camshaft blanks and determines the approximate amount of stock to be removed. He loads a camshaft blank between headstock and footstock of the master cam-camshaft assembly. He determines an approximately RRP (rough reset preset)size and inserts that that number into the control means via the counter control. He sets rough cycle and finish cycle wheel feed rates. Wheel retraction rate is fixed in the machine. He sets rough, finish and slow finish work rotation rates.

The operator then works a table control lever to index the work table to align the first cam position on the camshaft with the grinding wheel (and with the cam follower). The operator then pushes a cycle start button PB-9 and PB-10 (FIG. 13) to lower the rocking bar (and bring master cam one against the follower while cam one of the work is in working position).

Interlocks normally preventing wheel feed are released by table indexing to the first cam position and interlocks normally preventing work rotation are released by moving the rocker bar forward.

The operator sets the machine controls on manual and pushes a body feed button PB-18 or fine feed button PB-19 which operates the above described electrohydraulic pulse motor to advance the grinding wheel assembly towards the work at rough cycle speed. The wheel engages the work and is allowed to grind until it cleans the work but well before countout — that is, the operator pushes a zero reset button on the controller to stop wheel feed forward and return the wheel to its originally set RRP position and to set the RRP counter indicator at zero and doing this (i.e., pushing zero-reset button) well before the counter has counted down to zero. The rocker bar is retracted as the wheel is retracted and the work rotation stops.

The operator measures the base circle of the ground cam and determines the amount of stock left to read rough size. He presses the cycle start buttons PB-9 and PB-10 to cause the rocking bar to go forward, work rotation and wheel advance and grinding while feeding at fine feed rate until the rough size is reached, displaying the advance of the wheel from RRP to such rough size as a negative number on the FRP counter.

The operator then presses a rough size reset button to insert the pre-determined rough size number into the RSP counter. The wheel assembly retracts, the rocker bar moves out and work rotation stops. Initial setup, calibration and synchronization of controls is then complete.

Transition to Automatic Double Cycling

The operator then switches from manual to automatic control to go on to cam two, three, etc. for roughing each cam as described above under Basic Automatic Feed Cycle. Upon reaching the last cam as sensed by a table limit switch, the table is retracted back to present cam number one to the grinding wheel and finish grinding is conducted on the cams in sequence until the last cam position is reached whereupon the limit switch is again tripped and the table indexes longitudinally to an unload position, the rocker bar retracts, work rotation stops, the table is loaded and the wheel goes back to RRP position for dressing.

The operator unloads the finished camshaft, loads a new camshaft casting and the dual automatic cycle is begun again by pushing automatic cycle button, PB-9 and PB-11.

The functioning of the machine solid state logic components can be explained initially with reference to the hydraulic diagram of FIG. 3 and FIG. 1 and cross-reference to FIGS. 4–13 for electrical components. At the start of the cycle the machine is stopped in its loading position, its cycle selector switch is in dual cycle position, the operator has selected automatic on automatic/manual pushbutton selector controls (not shown). The wheel slide is in its rear position and the wheel start pushbutton PB-4 (FIG. 1) has been pushed. The foot stock is opened and the steadyrest SR is disengaged.

TO OPEN FOOTSTOCK - STEP 1

Figure 4:
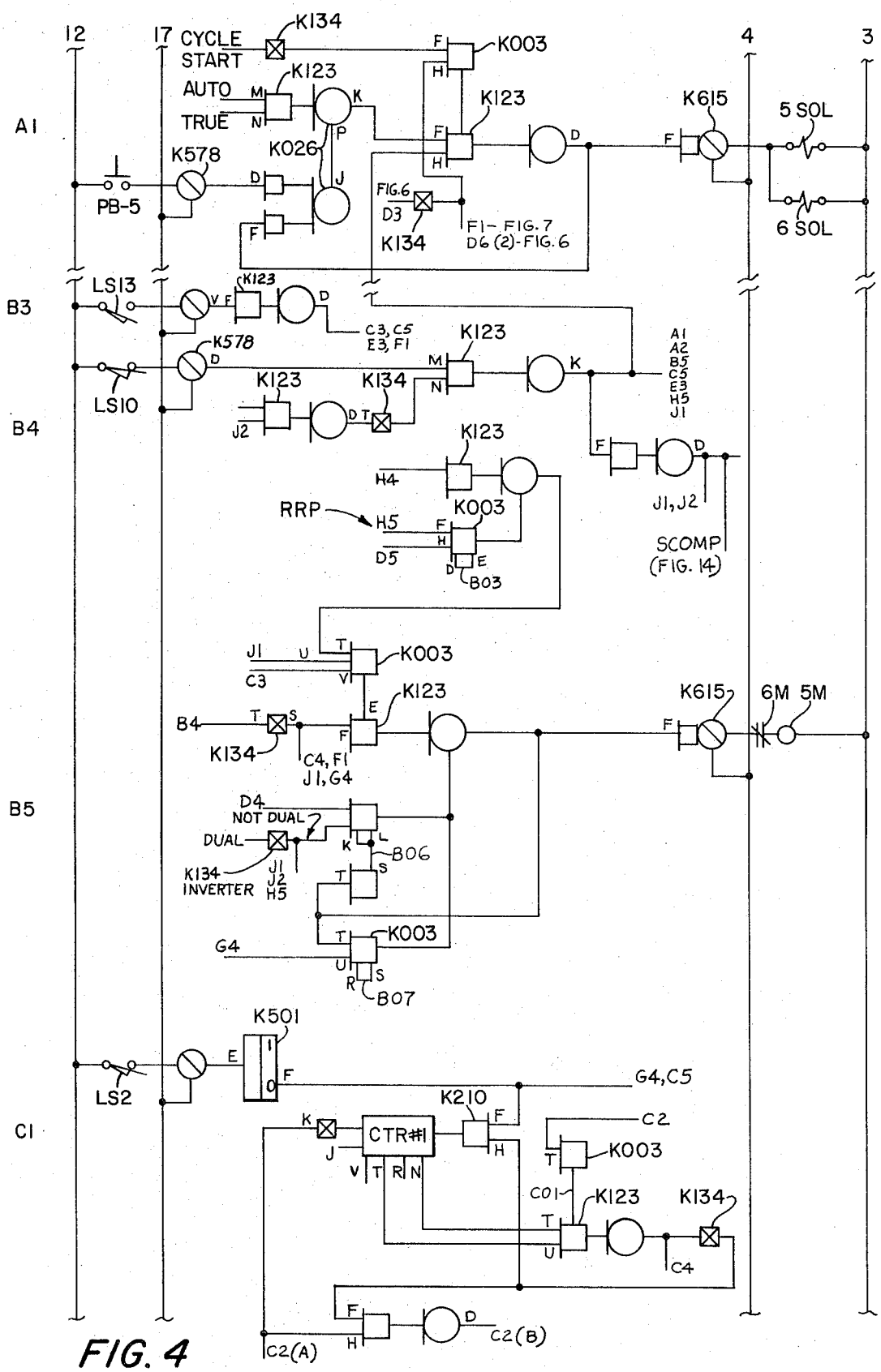
FIGS. 4–11 are interrelated circuit diagrams for a portion of the hard wired digital logic solid state controls of the machine, FIG. 11A being an extension of 11.
Figure 5:
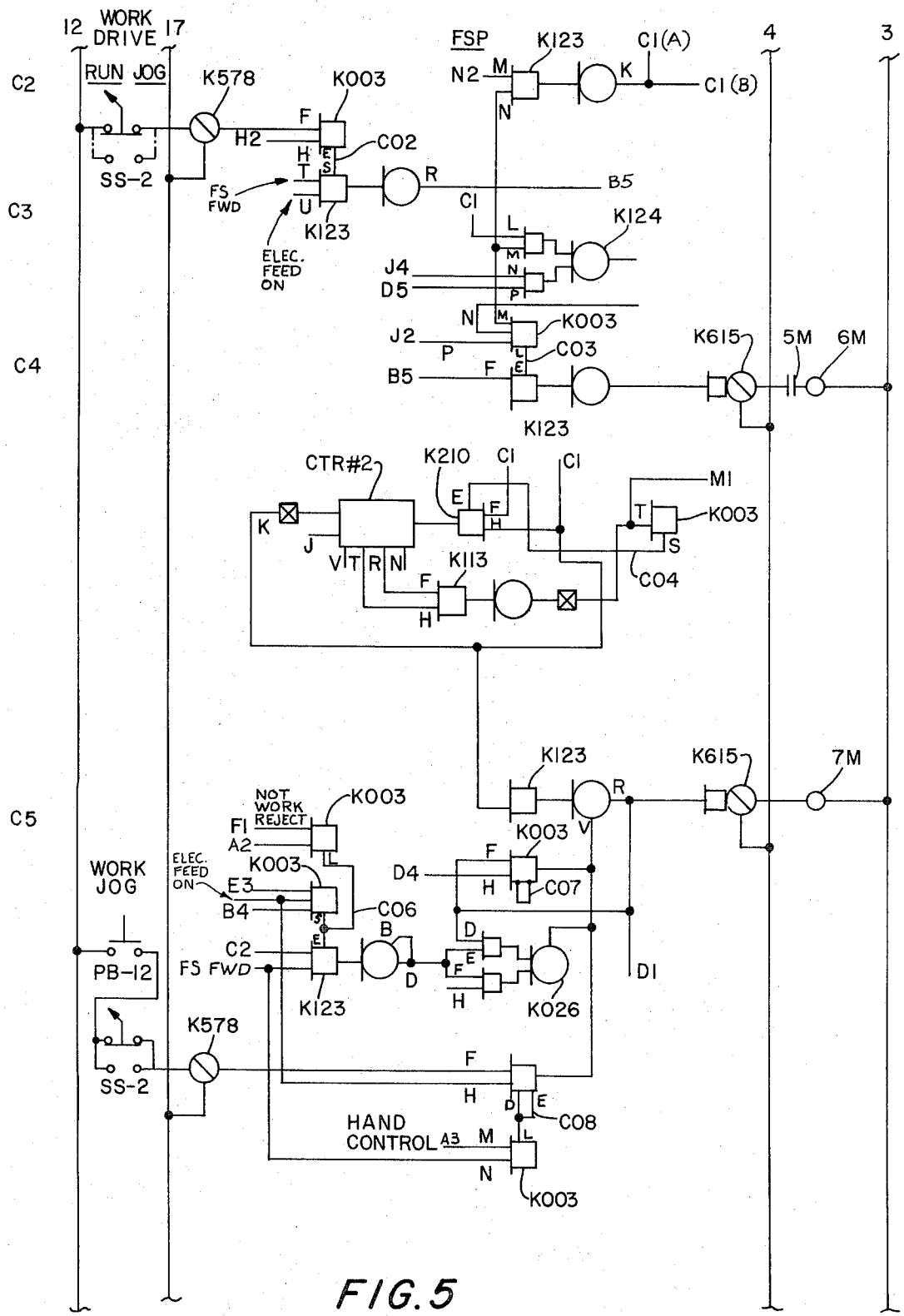
Figure 6:
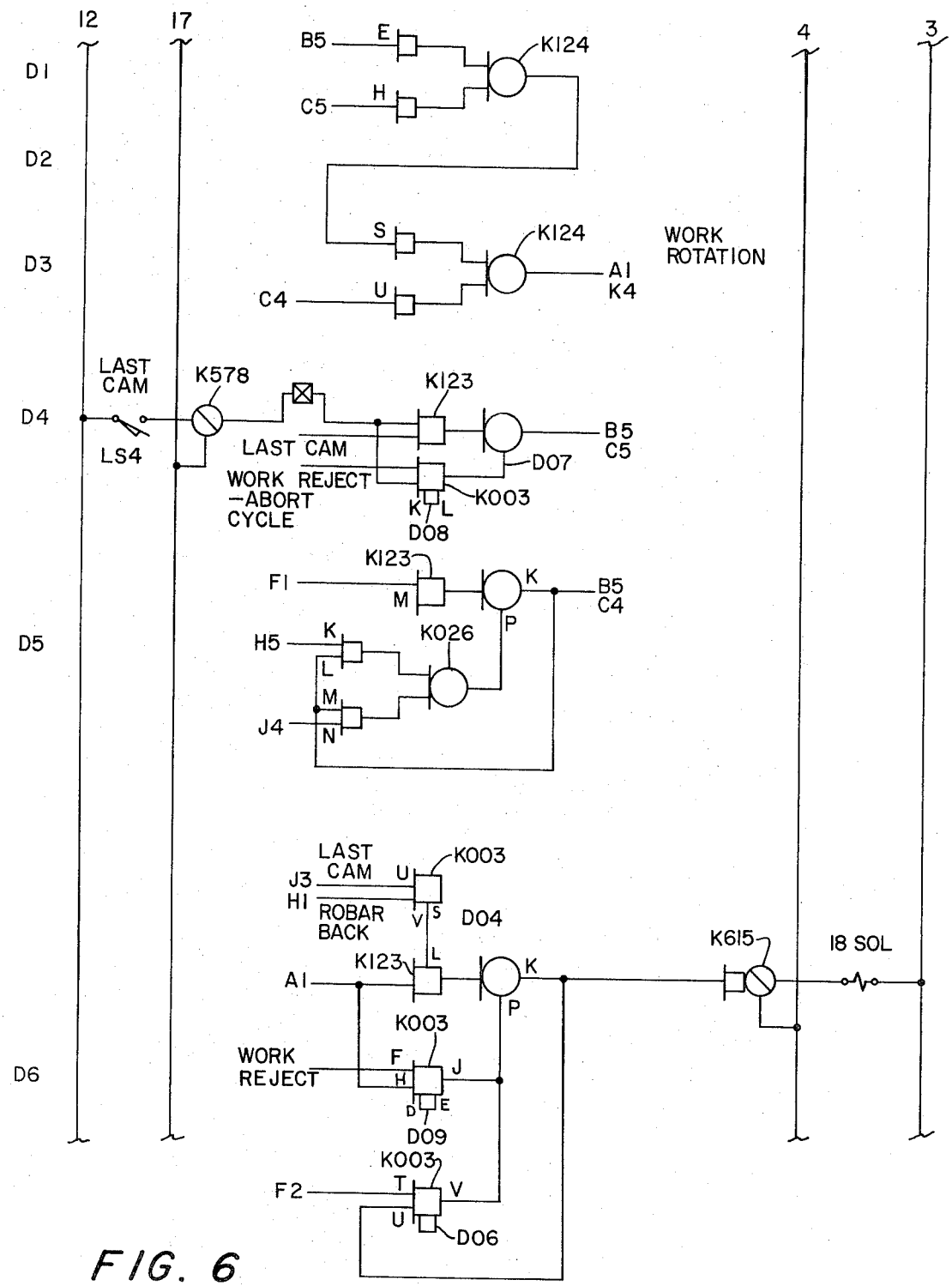
Figure 7:
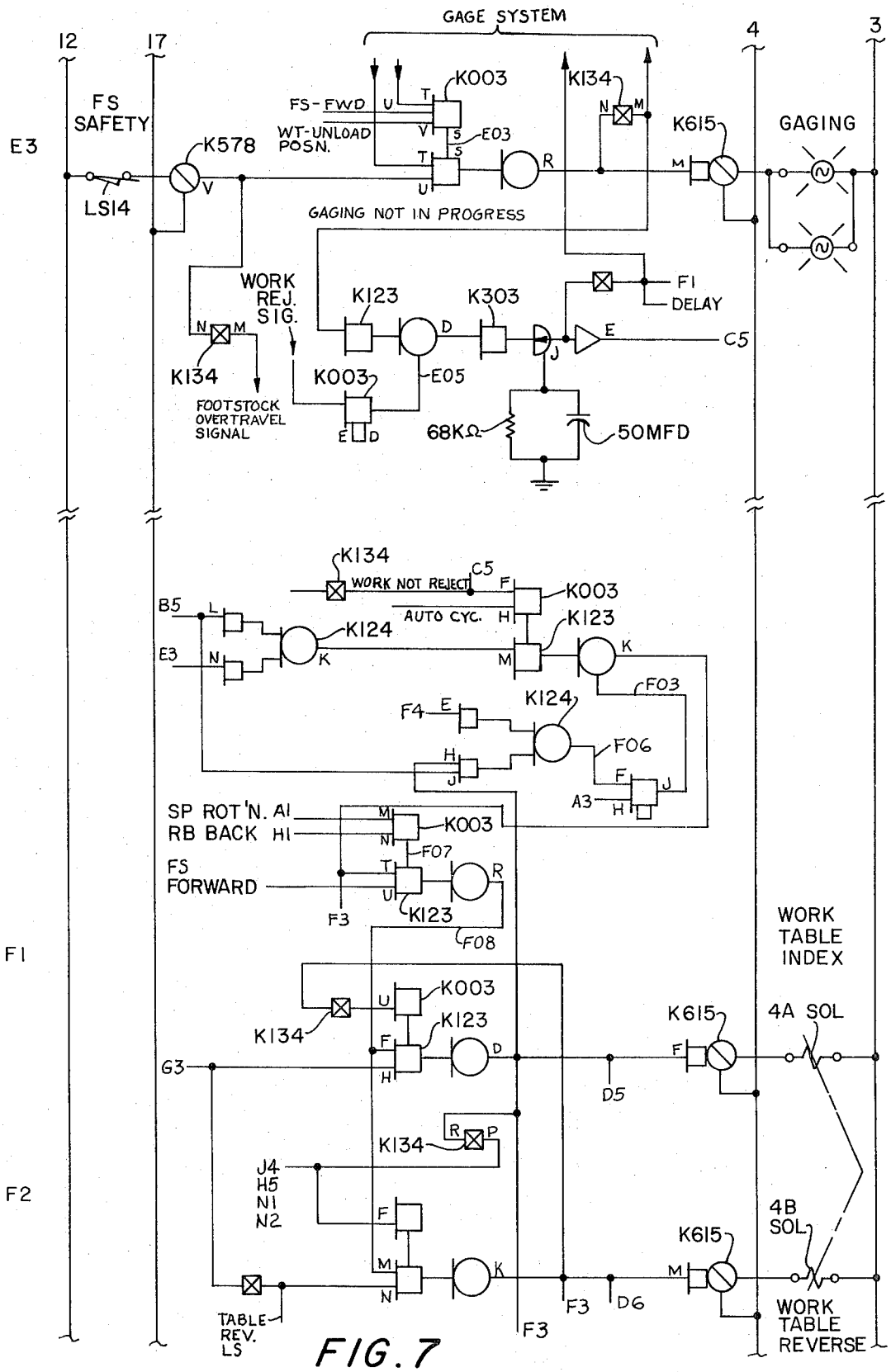
Figure 8:
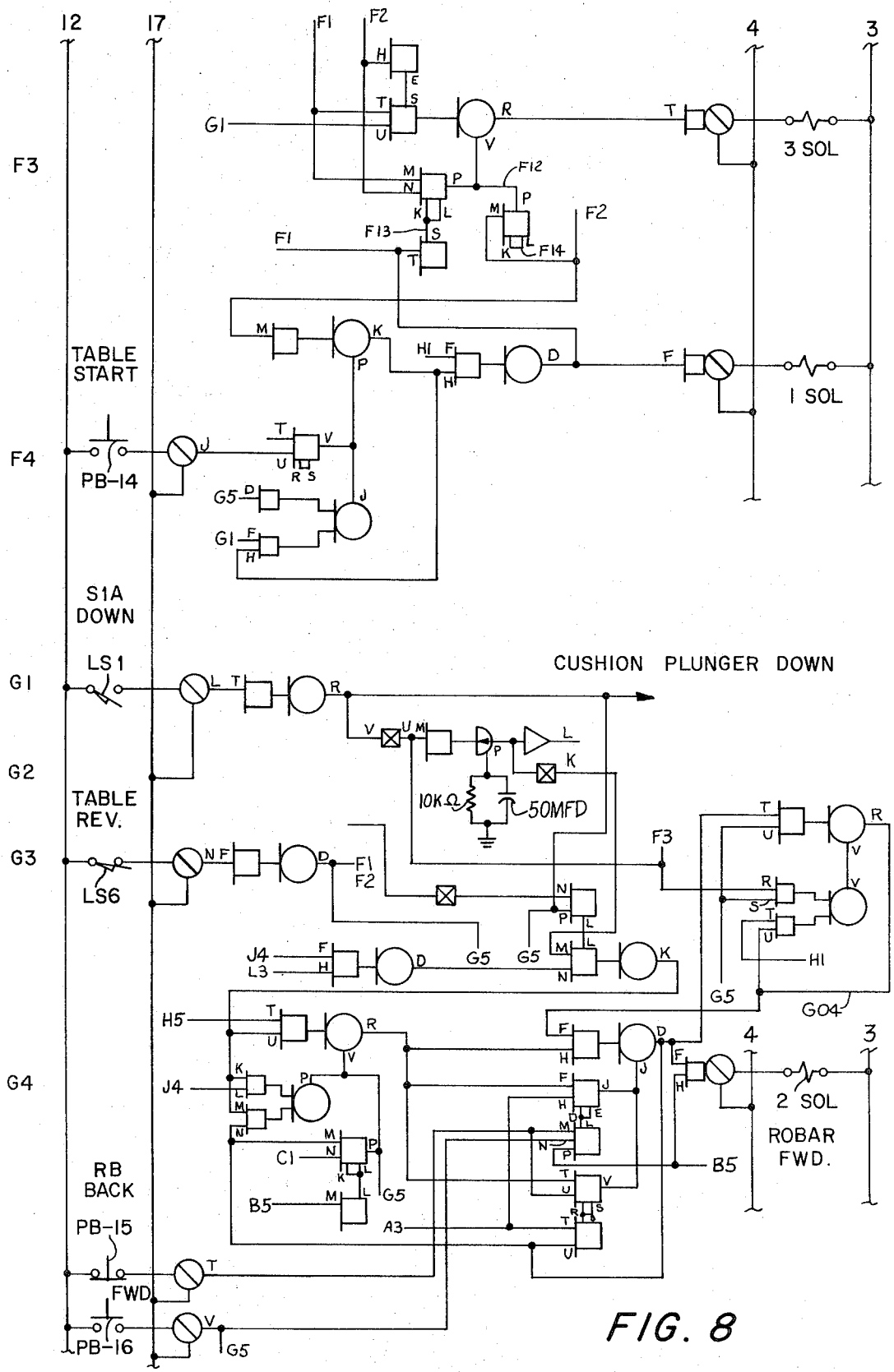
Figure 9:
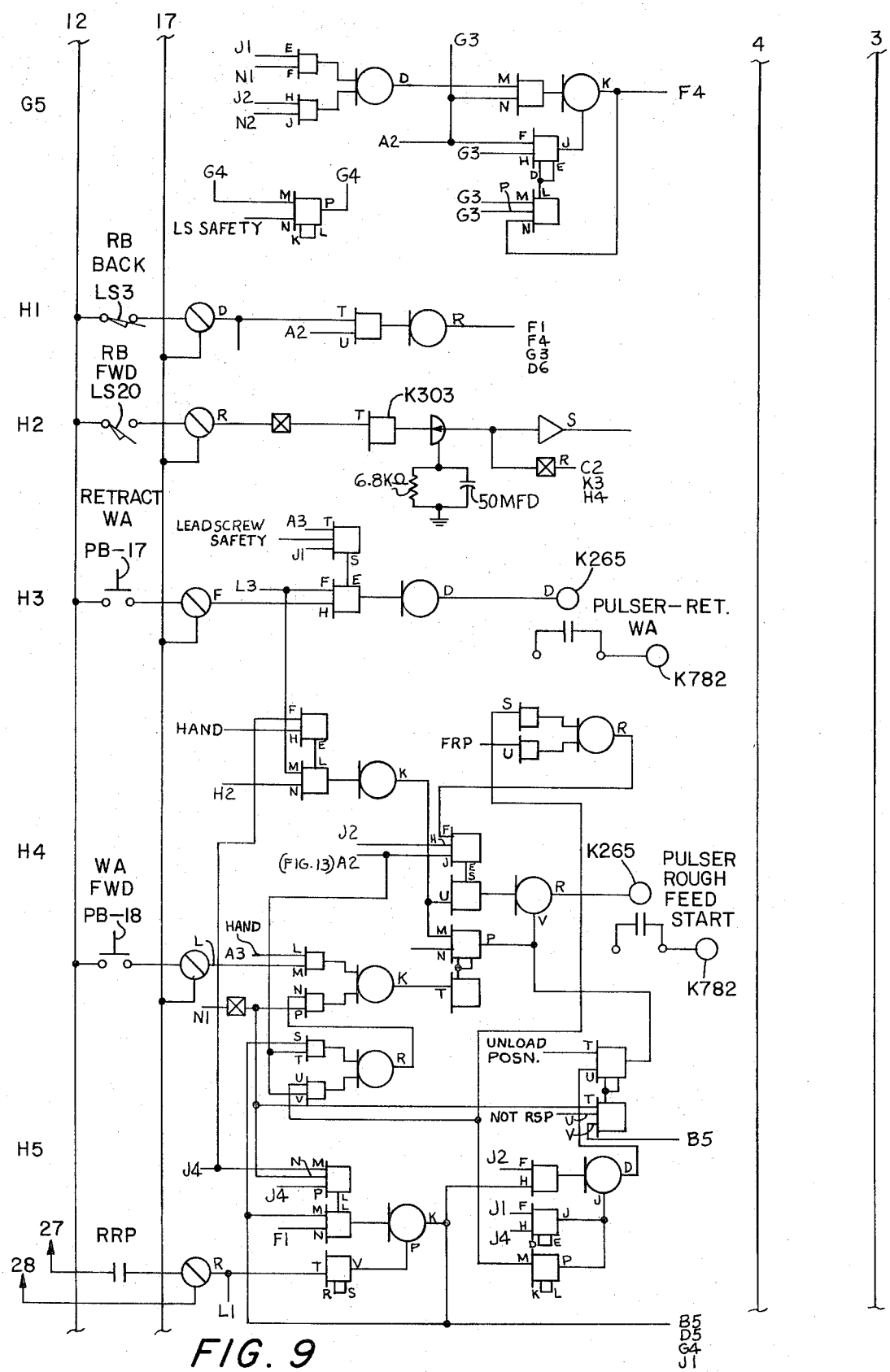
Figure 10:
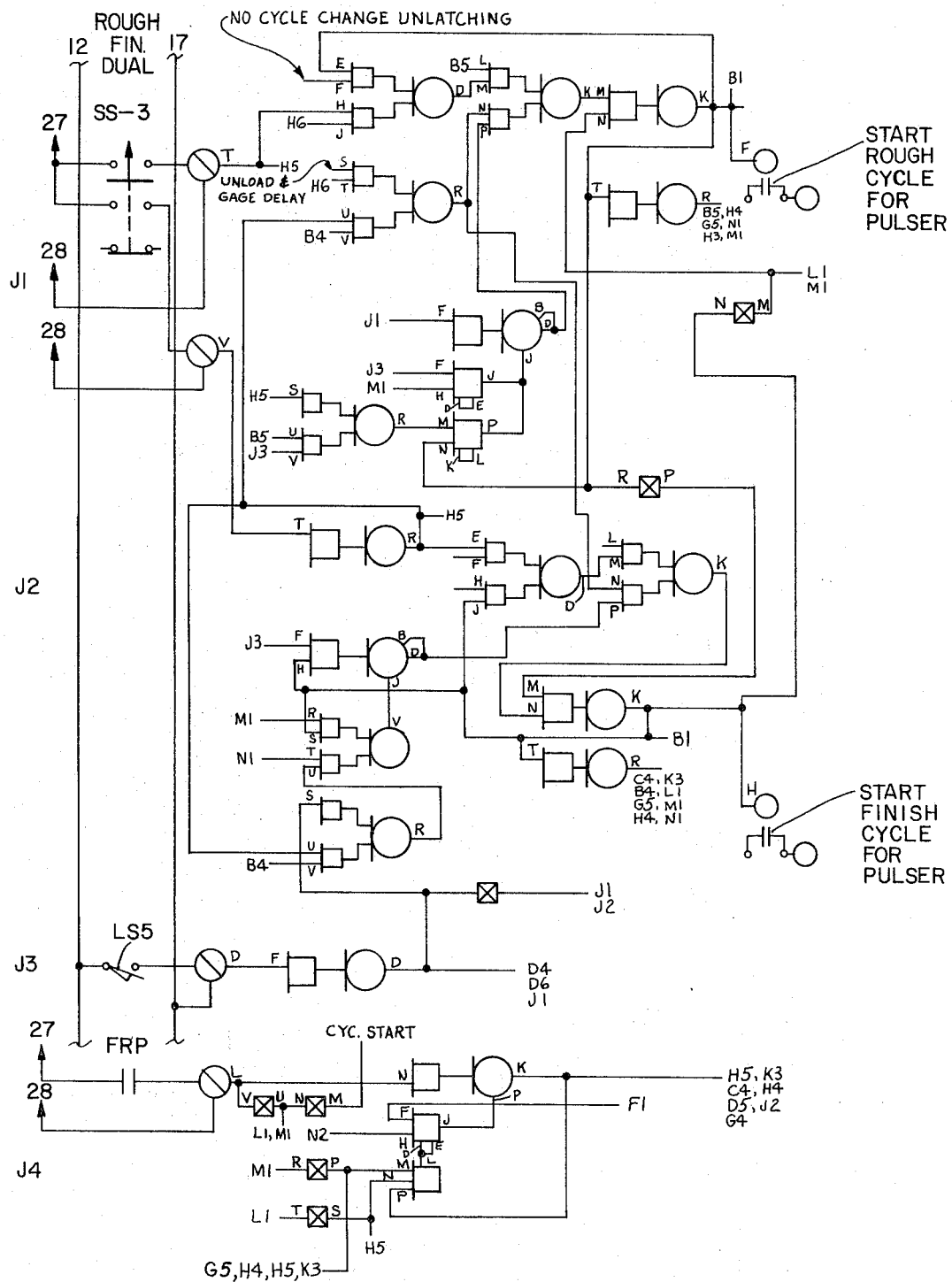
Figure 11:
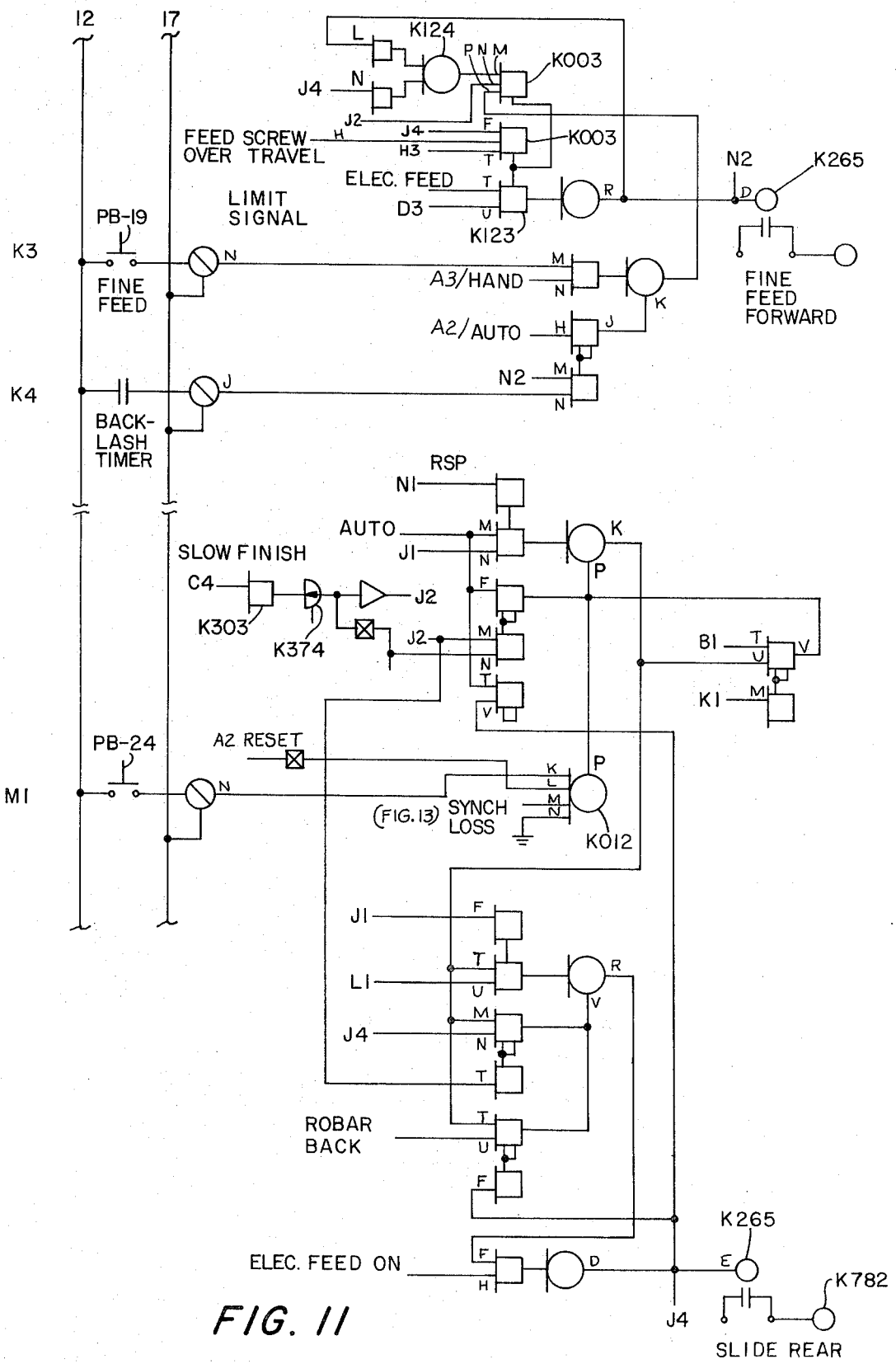

Depress PB-5 (Section A1 of FIG. 4)

| | |
|---|---|
| (K578) | D=1 |
| (K026) | D=1 |
| (K123) | K=1 |
| (K003) | F=1, H=1 |
| (K123) | F=1, H=1, D=1 |
| (K615) | F=1 |
| 5 SOL | energizes to retract footstock |
| 6 SOL | energizes to retract footstock |

The operator unloads the prior shaft and loads the new shaft to be worked on to a vee-shaped work support (not shown) and then:

FOOTSTOCK CENTER MOVES FORWARD — STEP 2

| | |
|---|---|
| (K134) | N=1, M=1 |
| (K003) | F=0 |
| (K123) | D=0 |
| (K615) | F=0 |
| 5 SOL | Deenergize to send footstock center forward |
| 6 SOL | Deenergize to apply steadyrest (hydraulic delay) |

FOOTSTOCK FORWARD SIGNAL — STEP 3

| | |
|---|---|
| B3 13 LS (NO) | actuated by footstock center forward |
| B3 (K578) | V=1 |
| B3 (K123) | F=1, D=1 |

The solenoid 5 SOL is deenergized so that its valve actuates cylinder FSH to close footstock FS and this activates limit switch 13LS. At the same time the state of solenoid 6 SOL is changed causing SRH to advance the steadyrest SR onto the work.

The closing of limit switch 13LS causes the start of work rotation and changes the state of a time relay to allow a delay for work inspection. Also, the state of solenoid 18 SOL has changed releasing full brake pressure.

After the time delay for inspection, the table WT is indexed to the right under the control of a valve operated by solenoid 4B SOL and activation of solenoid 3 SOL to provide table cushioning.

TABLE MOVEMENT (FIG. 7) — STEP 4

| | |
|---|---|
| F1 (K124) | N=1, K=1 |
| F1 (K123) | M=1, K=1 |
| F1 (K003) | F=1, H=1, M=1, N=1, U=1 |
| F1 (K123) | T=1, U=1, R=1 |
| F1 (K134) | V=0, U=1 |
| F1 (K123) | F=1, H=1, D=1 |
| F1 (K615) | F=1 |
| F1 4A SOL | energizes to index table to right (toward 1st cam) |
| F3 (K003) | H=1 |
| F3 (K123) | T=1, U=1, R=1 |
| F3 (K165) | T=1 |
| F3 3 SOL | energizes to remove table cushioning |

The work table WT moves to right towards the first cam position. Just prior to this location, the cushion plunger S1A is pushed downward by the first cam position index dog WTD, to close LS1.

(FIG. 8)

| | | |
|---|---|---|
| | G1 LS1 (NO) | actuated by index dog |
| | G1 (K578) | L=1 |
| | G1 (K123) | T=1, R=1 |
| | G2 (K134) | V=1, U=0 |
| | F3 (K123) | U=0, R=0 |
| | F3 (K615) | T=0 |
| | F3 3 SOL | deenergizes to apply table cushioning |

Table cushions up against stop, determined by table stop arm SL coming up against index dog. After a time delay initiated by the cushion plunger movement, the rocking bar RB moves forward.

(FIG. 8)

| | | |
|---|---|---|
| | G2 (K303) | M=0 after time delay K=1 |
| | G3 (K123) | M=1, N=1, K=1, T=1, U=1, R=1 |
| | G3 (K003) | N=1, P=1 |

| | | |
|---|---|---|
| | G3 (K026) | R=1, S=1 |
| | G2 (K123) | R=1 |
| | G4 (K123) | F=1, H=1, D=1 |
| | G4 (K615) | F=1, H=1 |
| | G4 2 SOL | energizes to move rocking bar forward |

Activation of limit switch LS1 causes a change of state of solenoid 3 SOL for operating the table cushion under the control flow control valve FCV1. There is also a change of state on time delay relay which would have provided a safety cut-in if the table failed to come to a positive stop at the first cam position as indicated by the first dog contacting the pawl. With the time delay relay deactivated, the rocking bar RB is caused to move forward by change of state of solenoid 2 SOL and this activates limit switch LS20. A change of state of solenoid 4B SOL causes a stopping of table movement.

ROCKING BAR MOVEMENT, WORK DRIVE — STEP 5

The rocking bar's coming almost all the way forward actuates the rocking bar forward limit switch, and also initiates a time delay which starts the rough work speed upon timing out. Time delay is necessary to insure that follower roller and master cam are in contact with each other before work starts to rotate. Also, the electric feed drives forward at rough grinding body feed rate.

| | | |
|---|---|---|
| | H2 LS20 (NO) | actuates by rocking bar's being forward |
| | H2 (K578) | R=1 |
| (FIG. 9) | H2 (K134) | T=1, S=0 |
| | H2 (K303) | T=0 after time delay R=1 |
| | C2 (K003) | F=1, H=1 |
| (FIG. 5) | C3 (K123) | T=1, U=1, R=1 |
| | B5 (K003) | T=1, U=1, V=1 |
| | B5 (K123) | F=1, D=1 |
| (FIG. 4) | B5 (K615) | F=1 |
| | B5 3 SOL | energizes to start work drive motor at roughing work speed |
| | H5 Rough Reset Preset Contact electric feed system output | |
| | H5 (K578) | R=1 |
| (FIG. 9) | H5 (K123) | K=1 |
| | Rough Reset Preset held in by | |
| | H5 (K123) | N=1, M=1 |
| | H5 (K003) | M=1, N=1, P=1 |
| | H4 (K124) | S=1, T=1, R=1, N=1, P=1, K=1 |
| | H1 LS 3 | deactuates as rocking bar moves off back position |
| | H1 (K578) | D=0 |
| | H1 (K123) | T=0, R=0 |
| (FIG. 9) | | |
| | H4 (K123) | N=1, M=1, K=1 |
| | H4 (K003) | F=1, H=1 |
| | H4 (K003) | M=1, T=1 |
| | H4 (K123) | R=1 |
| | H4 (K265) | E=1, reed relay contact closes to provide input to electric feed body feed forward circuit causing feed system to move forward at body feed rate |

WHEEL FEED AND RETRACT — STEP 6

The wheel assembly WA comes in at a rough grind body feed rate until the rough size preset position (RSP) is reached (visible on the DRO), at which point the feed is stopped. At this point the electric feed system gives an output signal which is fed into logic. This signal initiates a time delay which upon timing out retracts the wheelslide. The purpose of this time delay is to clean up the cam before retracting the slide.

| | | |
|---|---|---|
| | N1 Rough size preset contact output | electric feed system |
| | N1 (K578) | R=1 |
| | N1 (K134) | R=1, P=0 |
| | N1 (K303) | F=0, after time delay D=1 |
| | N1 (K003) | F=1, H=1, J=1 |
| | N1 (K123) | F=1, H=1, D=1 |
| | M1 (K003) | M=1 |
| | M1 (K123) | M=1, N=1, K=1, T=1, U=1, R=1 |
| (FIG. 11) | M1 (K003) | F=1 |
| | M1 (K123) | F=1, H=1, D=1 |
| | M1 (K265) | E=1 reed relay contact closes to provide input to electric feed slide rear circuit causing feed system to retract the wheelslide at retract rate |
| | RSP signal is held in until table starts to index | |
| | N1 (K003) | F=1, H=1 |
| | Slide rear signal is held in until rocking bar limit switch is actuated | |
| | M1 (K003) | T=1, U=1 |
| | M1 (K003) | F=1 |

TABLE INDEX — STEP 7

When RSP is reached the setup auto cycle circuit is energized to allow the table stop lug SL to be lowered starting the table index movement to the next cam. The rocking bar must be retracted for the stop arm to be lowered.

| | | |
|---|---|---|
| | G5 (K124) | E=1, F=1, D=1 |
| | G5 (K123) | M=1, N=1, K=1 |
| (FIG. 9) | G5 (K003) | F=1, H=1, M=1, N=1, P=1 |
| | F4 (K026) | D=1 |
| | F4 (K123) | K=1, F=1, H=1, D=1 |
| (FIG. 8) | F4 (K026) | F=1, H=1 |
| | F4 (K615) | F=1 |
| | F4 1 SOL | energizes to lower table stop arm |
| | F1 (K003) | U=1 |
| | F1 (K123) | F=1, H=1, D=1 |
| (FIG. 7) | F1 (K615) | F=1 |
| | J2 (K124) | S=1, R=1 |
| | J2 (K026) | T=1, U=1 |
| | J2 (K123) | D=1 |
| | J2 (K124) | N=1, P=1, K=1 |
| (FIG. 10) | J2 (K123) | M=1, N=1, K=1, T=1, R=1 (finish cycle) |
| | J2 (615) | M=1 |
| | J2 (K265) | H=1 reed relay contact closes to provide input to electric feed finish cycle circuit |

With work stopped and rocking bar back the table WT moves to the right until it hits a reversing lever LS5. Actuation of reversing lever deactuates table reverse lever limit switch (6LS) causing the table to reverse direction. Table WT/moves to the left until reversing lever is again actuated, causing reversing lever limit switch LS 6 to actuate, reversing direction of table movement. Table WT moves to the right.

| | | |
|---|---|---|
| | G3 LS6 (NOHC) | deactuated by table reversing lever being actuated |
| (FIG. 8) | G3 (K578) | N=0. |
| | G3 (K123) | F=0, D=0 |
| | G5 (K003) | M=0 |
| | G5 (K123) | K=0 |
| | F1 (K123) | H=0, D=0 |
| | F1 (K615) | F=0 |
| | F1 4A SOL | deenergizes to stop table movement to right |
| | F1 (K134) | R=0, P=1 |
| | F2 (K134) | N=0, M=1 |
| (FIG. 7) | F2 (K003) | F=1 |
| | F2 (K123) | N=1, M=1, K=1 |
| | F2 (K615) | M=1 |
| | F2 4B SOL | energizes to start table movement to the left |
| | F3 (K003) | M=1 |
| (FIG. 8) | F3 (K123) | R=1 |
| | F3 (K615) | T=1 |
| | F3 3 SOL | remains energized to remove table cushioning allowing table to move at fast traverse speed |
| | F4 (K123) | M=1, K=1, F=1, H=1, D=1 |
| | F4 (K615) | F=1 |
| | F4 1 SOL | remains energized to keep table stop arm lowered (there is also a hydraulic interlock keeps stop arm lowered |

|  | G3 LS6 (NOHC) | actuated by table reverse lever being actuated |
|---|---|---|
|  | G3 (K578) | N=1 |
|  | G3 (K123) | F=1, D=1 |
|  | F2 (K134) | N=1, M=0 |
|  | F2 (K123) | N=0, K=0 |
| (FIG. 7) | F2 (K615) | M=0 |
|  | F2 4B SOL | deenergizes to stop table movement to the left |
| (FIG. 7) | F1 4A SOL | energizes for table indexing. Table does not index until stop arm clear dog. |
|  | F3 (K003) | M=1, N=1, T=1 |
|  | F3 (K123) | R=1 |
|  | F3 (K615) | T=1 |
|  | F3 3 SOL | energizes to remove table cushioning |

As the table indexes over the next cam the cushion plunger limit switch is deactuated removing the setup auto cycle signal and also deenergizing the lower table stop arm solenoid causing it to move upward.

| (FIG. 8) | G1 LS1 (NO) | deactuates as table indexes, because cushion plunger moves away from index dog |
|---|---|---|
|  | G1 (K578) | L=0 |
| (FIG. 9) | G1 (K123) | T=0, R=0 |
|  | G5 (K003) | H=0 |
|  | G5 (K123) | M=0, K=0 |
|  | F4 (K026) | D=0, F=0 |
|  | F4 (K123) | K=0, H=0, D=0 |
| (FIG. 8) | F4 (K615) | F=0 |
|  | F4 (1 SOL | deenergizes to allow table stop arm to pop up |

Steps 4-6 excepting as described with respect to Section F1, F3, are now repeated for each cam.

When the machine has ground every cam and is grinding the last cam and rough size preset (RSP) is reached the feed stops and there is a time delay allowing the work to clean up. The moment the timer times out the cycle is transposed from rough to finish cycle, the slide retracts to the finish reset preset (FRP) position, which is the slide back position for finish grind.

Figure 11A:
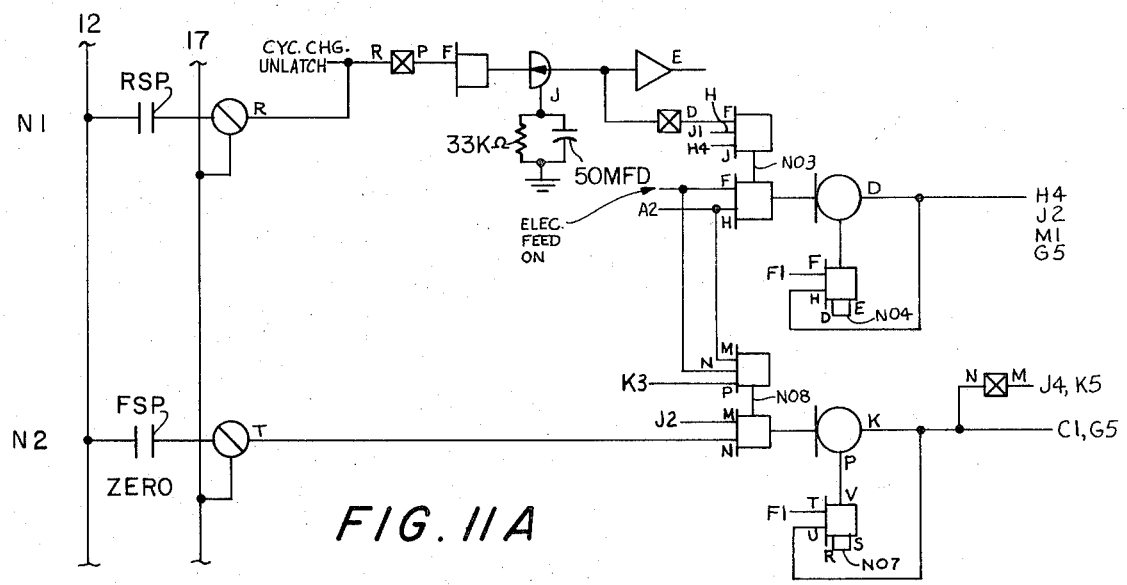

| (FIG. 11A) | N1 (K123) | D=1 |
|---|---|---|
| (FIG. 9) | H4 (K134) | V=1, U=0 |
|  | J1 (K124) | U=1, V=0, S=0, R=0 |
|  | J1 (K003) | M=0 |
|  | J1 (K123) | D=0 |
|  | J1 (K124) | P=0, K=0 |
| J1 (K123) |  | M=0, K=0, T=0, R=0 |
|  | J1 (K615) | F=0 |
|  | J1 (K265) | F=0 reed relay, contact opens removing input to electric feed rough cycle circuit |
| (FIG. 10) | J3 (NO) | actuated when in last cam position |
|  | J3 (K578) | D=1 |
|  | J3 (K123) | F=1 D=1 |
|  | J3 (K134) | T=1, S=0 |
|  | F1 (K134) | V=0, U=1 |
|  | F1 (K003) | U=1 |
| (FIG. 7) | F1 (K123) | F=1, H=1, D=1 |
|  | F1 (K615) | M=1 |
|  | F1 4A SOL | energizes to start table movement to the right |

The Table WT moves to the right and comes to cushioning stop in first cam position as outlined above in connection with FIG.

FINISH GRIND — STEP 8

At completion of truing cycle, the machine which has been waiting at the first cam position resumes its grind cycle by having the rocking bar move forward.

|  | G3 (K134) | R=0, P=1 |
|---|---|---|
|  | G3 (K003) | N=1, P=1 |
| (FIG. 8) | G3 (K123) | M=1, N=1, K=1, T=1, U=1, R=1 |
|  | G4 (K123 | H=1, F=1, D=1 |
|  | G4 (K615) | F=1 |
|  | G4 2 SOL | energizes to move rocking bar forward |

After the time delay, initiated by rocking bar full forward limit switch (LS20) the electric feed drives forward at body feed rate. The purpose of this being to take up the backlash in the feed train at a fast rate.

| (FIG. 10) | J4 (K003) | P=1, F=1, H=1, M=1, N=1 (FRP Hold) |
|---|---|---|
|  | H4 (K124) | U=1, R=1 |
|  | H4 (K003) | F=1, H=1, J=1 |
| (FIG. 9) | H4 (K123) | U=1, R=1 |
|  | H4 (K265) | E=1 reed relay contact closes to provide input to electric feed body forward circuit causing feed system to move forward at body feed rate |

Because the electric feed system, has a finish cycle input, the system backlash time initiates when the signal is given to move the slide foward. The length of backlash time is determined by the amount of feed required to take up the backlash.

The timer, upon timing out stops the body feed rate and initiates the fine feed rate, providing the rocking bar is forward and the work is rotating.

|  | K4 Backlash timer contact closes | Electric feed system output |
|---|---|---|
|  | K4 (K578) | J=1 |
|  | K4 (K003) | H=1, N=1, M=1 |
|  | K4 (K123) | K=1 |
| (FIG. 11) | K3 (K124) | N=1, K=1 |
|  | K3 (K003) | M=1, N=1, P=1, F=1, H=1, J=1 |
|  | K4 (K123) | T=1, U=1, R=1 |
|  | K4 (K265) | D=1 reed relay contact closes to provide input to electric feed fine feed forward circuit causing feed system to move forward at fine feed rate |

When the rocking bar forward delay signal goes high, the work starts turning at the fast finish rate.

|  | C3 (K124) | N=1, P=1, K=1 |
|---|---|---|
|  | C4 (K003) | M=1, N=1, P=1 |
| (FIG. 5) | C4 (K123) | F=1, D=1 |
|  | C4 (K615) | F=1 |
|  | C4 6M | energizes to start fast finish work speed at motor M5 |

The work continues to rotate at fast finish speed until the electric feed system stops the slide movement at finish size count. The fast finish counter now controls the number of additonal work rotations at fast finish speed required for the work to round out before the speed is changed from fast finish to slow finish

|  | N2 Finish Size Zero count contact closes | Electric feed system stops |
|---|---|---|
| (FIG. 11A) | N2 (K578) | T=1 |
|  | N1 (K003) | M=1, N=1, P=1 |
|  | N2 (K123) | M=1, N=1, K=1 |
|  | N3 (K003) | T=1, U=1 (hold circuit) |
|  | N1 (K134) | N=1, M=0 |
|  | K4 (K003) | M=0 |
|  | K4 (K123) | K=0 |
| (FIG. 11) | K3 (K003) | P=0 |
|  | K4 (K123) | R=0 |
|  | K4 (K265) | D=0, reed relay contact opens to remove signal to electric feed fine forward circuit stopping feed |
| (FIG. 5) | C2 (K123) | M=1, N=1, K=1 |
|  | C1 (K123) | F=1, H=1, D=1 |
|  | C1 (K210) | K=1 removes clear from counter enabling it to count |
| (FIG. 4) | C1 LS2 (NOHC) | actuated by master cam nose contacting the roll causing the rocking bar to rock back |
|  | C1 (K578) | F=1 |
|  | C1 (K501) | E=1, F=0 |
| (FIG. 4) | C1 (K210) | F=0 records count |
|  | Upon count out |  |
|  | C1 (K123) | T=1, U=1, R=1 |
|  | C1 (K134) | V=1, U=1, |
|  | C2 (K123) | F=0 D=0 |
|  | C3 (K124) | L=0, N=0, P=0, K=0 |
|  | C4 (K003) | N=0 |

| | | |
|---|---|---|
| | C4 (K123) | D=0 |
| | C4 (K615) | F=0 |
| | C4 | deenergizes to remove power from fast finish work motor |
| | C4 (K210) | K=1, removes clear from counter enabling it to count |
| (FIG. 5) | C5 (K123) | U=1, R=1 |
| | C5 (K615) | M=1 |
| | C5 | energizes to start slow finish work speed — motor M7 while clutch K isolates motor M5 |

The length of time the work rotates at slow finish work speed is determined by the count setting of the slow finish work speed counter. The count signal given by the cam nose signal limit switch LS2. Upon count out the slide is retracted.

| | | Upon count out |
|---|---|---|
| (FIG. 5) | C4 (K113) | F=1, H=1, D=0 |
| | M1 (K303) | M=0 after time delay K=1 (time delay required to ensure round out of cam) |
| | M1 (K003) | F=1, M=1, N=1 |
| (FIG. 11) | M1 (K123) | K=1 |
| | M1 (K003) | M=1, N=1, T=1 |
| | M1 (K123) | R=1 |
| | M1 (K123) | F=1, D=1, D=1 |
| | M1 (K265) | E=1 reed relay contact closes to provide input to electric feed slide rear circuit causing feed system to retract wheel-slide at retract rate |
| | Finish size count signal is held in until table starts to index. | |
| (FIG. 11) | N2 (K003) | T=0 |

Stopping of work motor, rocking bar back functions as in step 6 except FSP count signal is substituted for RSP.

DUAL CYCLE END — UNLOAD — STEP 9

At the moment the signal is given for the slide to retract, the machine cycle is transposed from finish to rough cycle, the slide retracts to the rough reset preset (RRP) position which is the slide back position for rough grind.

| | | |
|---|---|---|
| (FIG. 11) | M1 (K303) | M=0 after time delay L=0, K=1 |
| | J3 LS5 (NO) | actuated when in last cam position |
| | J3 (K578) | D=1 |
| | J3 (K123) | F=1, D=1 |
| | J3 (K134) | T=1, S=0 |
| | J2 (K026) | R=0 |
| | J2 (K123) | D=0, F=0 |
| | J2 (K124) | P=0, K=0 |
| | J2 (K123) | N=0, K=0, T=0, R=0 |
| | J2 (K615) | M=0 |
| (FIG. 10) | J32 (K265) | N=0 reed relay contact opens removing input to electric feed finish cycle circuit |
| | J1 (134) | N=0, M=1 |
| | J1 (K003) | F=1, H=1 |
| | J1 (K123) | D=1, |
| | J1 (K124) | N=1, P=1, K=1 |
| | J1 (K123) | M=1, N=1, K=1 |
| | J1 (K615) | F=1 |
| | J1 (K265) | F=1 reed relay contact closes to provide input to electric feed rough cycle circuit |

After the rocking bar gets full back after grinding the last cam the slow work speed motor loses its power and the workhead is braked to a stop when the last cam work stop limit switch (LS4) is actuated.

| | | |
|---|---|---|
| | D4 LS4 (NO) | actuated by cam on end of master cam spindle when rocking bar is in its full back position |
| (FIG. 6) | D4 (K578) | N=1 |
| | D4 (K134) | V=1, U=0 |
| | D4 (K123) | F=0, H=1, D=0 |
| | C5 (K003) | H=0 |
| | C5 (K123) | R=0 |
| (FIG. 5) | C5 (K615) | M=0 |
| | C5 7M | deenergizes to remove power from slow finish work speed motor |
| | D1 (K124) | H=0, D=0 |
| | D3 (K124) | S=0, R=0 |
| (FIG. 4) | A1 (K134) | R=0, P=1 |
| | D6 (K003) | U=1, V=1 |
| | D6 (K123) | N=1, K=1 |
| (FIG. 6) | D6 (K003) | T=1, U=1 (hold) |
| | D6 (K615) | F=1 |
| | D6 18 SOL | energizes to engage hydraulic brake. The purpose of the braking action is to stop the work rotation at the proper angle so that the work can be unloaded and loaded. |

The brake is released when the table reverses from left to right.

The table WT after finish grinding the last cam reverses its traverse, as described above in connection with rough grinding. However, when the table reverses back into the direction of grind it stops in the unload position at which time the footstock FS retracts and the work can be unloaded.

| | | |
|---|---|---|
| | B4 LS10 (NOHC) | actuated by the dog on the left hand end of base front signifying table is in unload or load position |
| (FIG. 4) | B4 (K578) | D=1 |
| | B4 (K123) | F=1, H=0, D=0 |
| | B4 (K134) | T=0, S=1 |
| | B4 (K123) | M=1, N=1, K=1 |
| | F1 (K124) | L=0, K=0 |
| | F1 (K123) | M=0, K=0, T=0, R=0 |
| (FIG. 7) | F1 (K123) | F=0, D=0 |
| | F1 (K615) | F=0 |
| | F1 4A SOL | deenergizes to stop table index movement |
| | A1 (K123) | M=1, N=1, K=1 |
| | A1 (K003) | F=1, H=1 |
| | A1 (K123) | F=1, H=1, D=1 |
| (FIG. 4) | A1 (K615) | F=1 |
| | A1 5 SOL | energizes to retract footstock |
| | A1 6 SOL | energizes to retract steadyrest |

FIG. 12 shows a block diagram of the inputs and outputs of the machine logic serially arranged. FIG. 12 should be viewed together with FIGS. 1 and 3 to understand the interrelationship of electrical or electromechanical sensors and actuators with hydraulic actuators and the machine logic section. The following operating descriptions can be read in conjunction with these systems diagrams before turning to the detailed component apparatus and mode of operation description given in connection with FIGS. 4–14.

Figure 13:
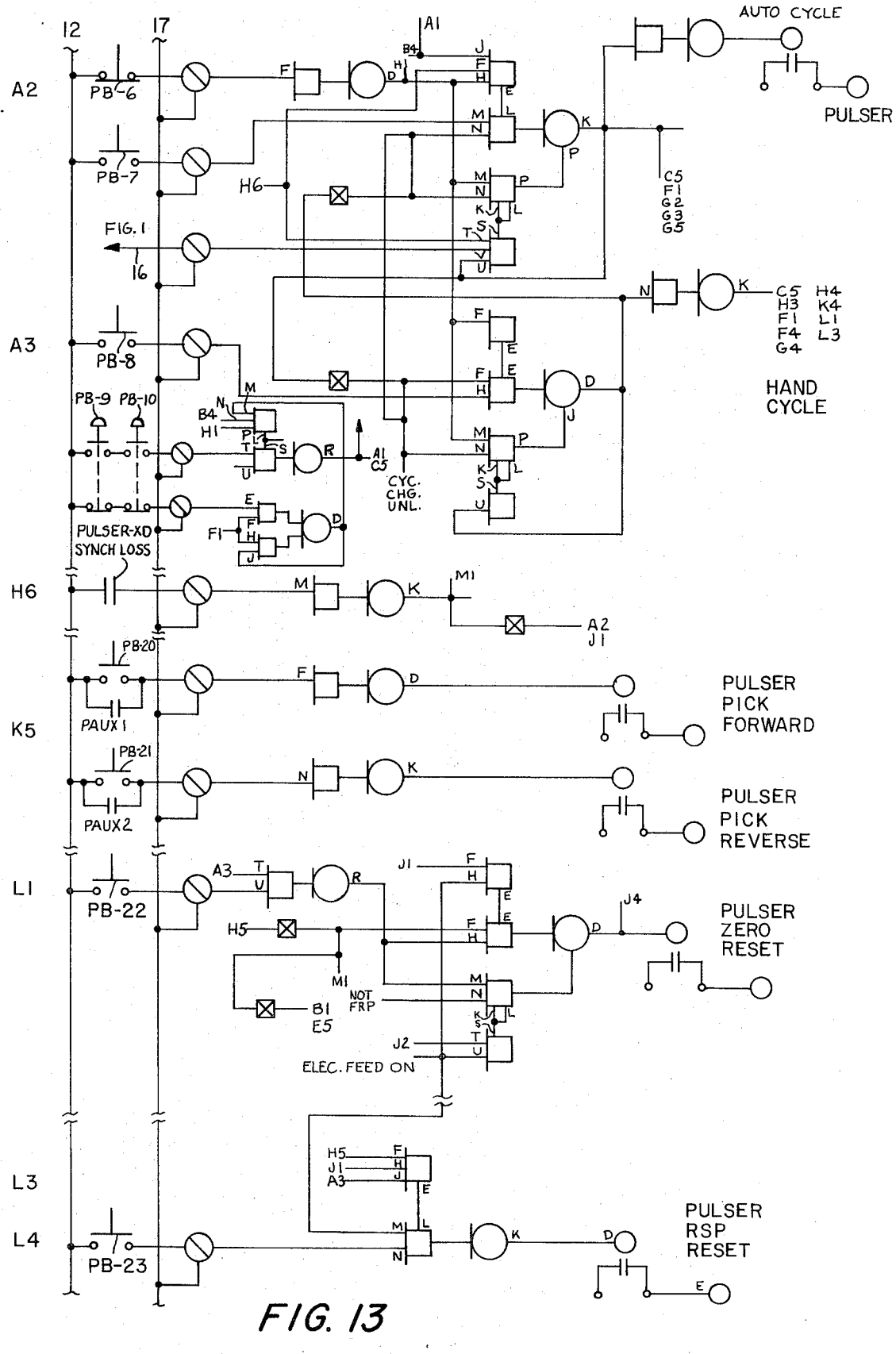
FIG. 13 is a circuit diagram similar to FIGS. 4–11 for auxiliary hand/automatic selector, synchronism loss and zero reset controls of the machine.

FIG. 13 shows the hand/automatic cycle selector logic sections at A2, A3, synchronism loss signal transmittal logic at H6, pick logic at K5 and zero rest at L1. These are interconnected to the main cycle logic of FIGS. 4–11 as indicated in the drawings to enable the operator to use the same system to run the wheel feed and related machine cycle via manual push buttons or automatically, to stop operation in case of pulser synchronism loss, to pick the wheel feed forward or back and to reset the pulser to zero.

The manual mode operations involve components operation as follows.

If the footstock FS is closed the operator presses Footstock Open button PB-5 to open the footstock, which will not open unless table WT is in the unload position.

To close the footstock the operator provides a Cycle start signal via buttons not shown. The footstock will go forward providing:

A. The rear reset count as registered in the DRO is correct for the machine grind cycle (rough or finish).

If the DRO does not register RRP (rough reset preset) for rough cycle, or FRP (finish reset preset) for finish cycle, the following must be done:

(A1) Assume: FRP setting in DRO, rough cycle required. Maching table must be in unload position. The operator turns cycle selector switch SS-3 to Rough and depresses Reset button PB-6 to get the machine out of hand mode. A Cycle Auto button is pressed to send the slide back at body feed rate, stopping when RRP is reached. Reset button gets the machines out of Auto Mode. Depressing a Cycle Hand button gets the machine back in hand mode.

(A2) Assume: RRP in DRO. finish cycle required machine table must move to unload position. The cycle selector switch SS-3 is turned to Finish. Reset button gets the machine out of Hand Mode. Cycle Auto button is pressed to send the slide forward at body feed rate, stopping when RSP (rough size preset) is reached. The RSP signal causes the wheelslide to retract, stopping when FRP is reached. Reset button gets the machine out of auto mode. Cycle Hand button gets the machine back into the hand mode.

The operator starts the table moving to the right. Just before reaching the table stop dog WTD for the cam to be ground he releases Table Start (PB-14) button, thereby stopping the table at the approaching table stop dog.

To bring the rocking bar forward, he depresses Rocking Bar Forward button PB-16 causing the rocking bar RB to go forward.

If the work selector switch SS-2 is on Work-Run, the spindle will rotate at roughing speed if the machine is in rough cycle, or in fast finish speed if machine is in finish cycle. If the work selector switch is on Work-Jog, the workhead will not rotate. To get the workhead to rotate, the operator depresses the Work-Jog button, causing the workhead to rotate at a slow finish speed.

To get the slide forward, the following is required:
A. Rough Cycle

The operator presses the Body Feed Forward push botton PB-18 causing the wheel assembly slide to come forward at rough grind cycle feed rate as long as the button is kept depressed. Release of the Body Feed Forward button will stop slide motion. To get controlled slide rear movement, he depresses the Body Feed Reverse button, causing the slide to retract at body feed rate. Release of Body Feed Reverse button will stop retraction of wheelslide.

B. Finish Cycle

Depressing the Fine Feed Forward pushbutton PB-19, causes the wheel assembly slide to come forward at fine feed rate as long as the button is kept depressed. Releease of the Fine Feed Forward button will stop slide motion.

C. Incremental Slide Motion

Picking of the slide, either in forward or reverse direction, can be accomplished in either rough or finish cycle and at any time.

1. Pick Forward

Depress Pick Forward button PB-20 causing the slide to move forward the equivalent of one pulse of the stepping motor, (0.0001 inch on radius). To get next pulse or pick, Pick Forward button must be released and then depressed.

2. Pick Reverse

Depress Pick Reverse button PB-21 causing the slide to move back the equivalent of one pulse of the stepping motor (0.0001 inch on radius). To get next pulse or pick Pick Reverse button must be released and then depressed.

To retract the slide, the following is required:

There are actually five pushbuttons which will cause the slide to move back. Therefore when in hand mode care must be taken to know where the slide is and how far it will go.

A. Pick Reverse button PB-21. Depressing this button will cause slide to retract back one pulse of stepping motor (0.0001 inch on radius). Will not register on DRO (digital read out) and is controlled by electric feed presets.

B. Body Feed Reverse button PB-17. Depressing this button will cause slide to retract back at body feed rate. Release of button stops motion. This registers on DRO and is not controlled by electric feed presets. Therefore it is possible to drive the slide beyond the reset presets.

C. Rough Size Reset button PB-23. This button is depressed when size is reached during hand grind of shaft in rough cycle. Depression of button will cause slide to retract back to RRP at slide retract rate.

D. Zero Reset button PB-22. Depressing this button will cause slide to retract back the full amount of feed (RRP-RSP if in rough cycle, FRP-0 count if in finish cycle) regardless of the slide position at the movement of slide reversal. Slide will retract back at slide retract rate.

E. Wheelslide Rear button PB-24. Depressing this button will cause the slide to retract back to the reset preset (RRP for rough cycle, FRP for finish cycle) at slide retract rate.

Figure 14:
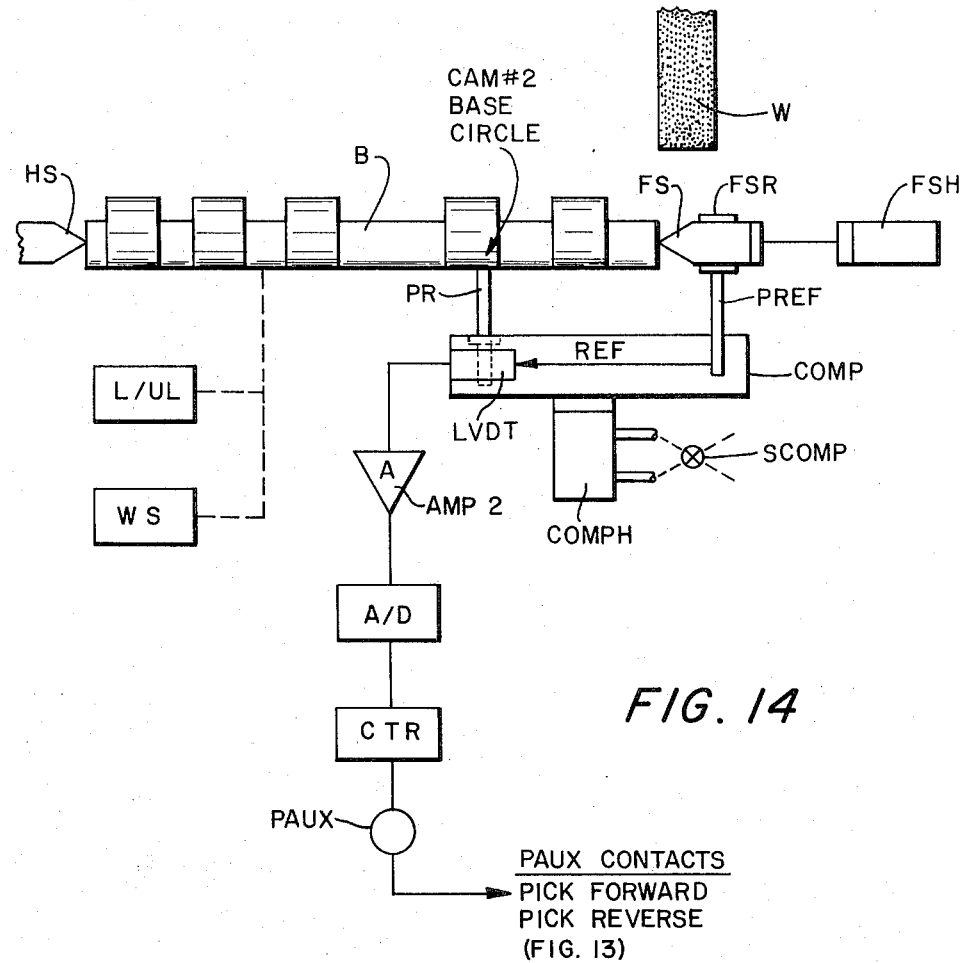
FIG. 14 is a diagram of a post process gaging arrangement of particular utility in connection with the use of automatic loaders.

Referring now to FIG. 14 there is shown an apparatus arrangement for automatic post-process gaging of work size and theoretical stock removal, as established by the above describe calibration and setup precedure and normal machine operation, and actual stock removal at a given time. The apparatus shows a finished camshaft blank B still mounted between the headstock HS and footstock FS centers on the spindle SP portion of the rocking bar RB as the worktable WT moves to its unlead longitudinal position (indicated with reference to the wheel W in FIG. 14) and the rocking bar rocks back. In rocking back the work may come into alignment with conventional vee work supports WS and then be released onto them and manually removed, or removed by automated loading, unloading means L/UL, which are per se well known. A comparator device COMP driven by a hydraulic motor COMPH advances to place a reference probe PREF against a circular reference, which is preferably a finely machined ring FSR on the footstock.

The comparator also has a gage probe PR advanced by spring loading against the base circle of a cam. Distance of the probe PR advance is determined by a linear variable differential transducer LVDT and a differential analog signal reflecting advance is fed to an amplifier AMP2, analog-digital convertor AD, a pulse counter CRT and relay PAUX to operate the pick forward or pick reverse auxilary contacts shown in FIG. 13 by a number of increments corresponding to the differential probe advance measured. This allows freedom from operator post-gaging and makes possible the utilization of automatic loading/unloading equipment. The above described operation of the FIG. 1–13 structure is in no way disrupted or modified excepting that it is desirable to add a time delay switch affording one second time delay for shaft settling and actuate the time delay when the table comes to rest and actuate the time delay count by the table position circuit switch. A similar post-gaging delay of 1 second should be provided to allow gage retraction. The solid state logic of the machine is indifferent to whether the manual pick forward/pick reverse buttons or their automated auxiliary contacts are actuated.

The COMP/COMPH structure is supported from the fixed base structure FB of FIG. 1.

In addition to, or in lieu of, the post process gaging and zero wheel feed reference compensation described in connection with FIG. 14 above, similar apparatus can be arranged at the working station to measure each cam after it is finish ground (or during completion of the finish grinding cycle die out turns) and provide the zero compensation from cam to cam to afford a lowering of tolerances. The probe PR would be directly opposite the wheel W in such case.

The comparator apparatus components are conventional per se, and should be selected to afford a ±0.005 inch range and a resolutonn of 0.0001 inches and to make a reading and slide correction in half a second or less.

I have therefore provided a machine affording improvement in dual cycle camshaft grinding affording flexibility of usage and adaptability to modification, economy, and accuracy and precision, all as described above. Conventional machine features have such as indicator lights, coolant and lubricant systems, electric and hydraulic power controls unrelated to the logic, truing and truing compensation systems, wheel swivel systems and the like have been omitted to more clearly show the main operating components. These may be as described in the above cited patents or in other prior art or adapted according to the circuit and logic principles set forth herein. Many variations can be made within the broadest scope of the present invention. For instance, the machine's hard wired solid state logic could be replaced by a programmable controller, or relay logic elements performing similar functions of Boolean logic gating. It is therefore intended that the above disclosure shall be read as illustrative and not in a limiting sense.

What is claimed is,

1. An improved machine for grinding camshaft blanks or the like, comprising in combination:

a work table means movable in a longitudinal direction parallel to a characteristic long dimension of the work table, b. rocking bar means mounted on said table and comprising a rotatable work support and rotatable master cam spindle, having a plurality of annular cam shapes thereon, mounted on a rocker bar along a common first axis parallel to the direction of longitudinal movement of the table, and motive power means for moving said work into engagement with a master cam follower and away therefrom, c. means for driving said spindle and work support rotatably at selected fast and slow speeds of rough cycle work and a slow speed of finish work, d. grinding means comprising at least one grinding wheel and electric pulse motor means for feeding said wheel along a second direction perpendicular to said first direction inwardly to and outwardly from the work area defined by the work support at selected fast and slow speeds and means for rotating the wheel at selected speeds, e. electrical control means for controlling the feed of the wheel from a rough reset preset position, inwardly to rough size preset position, then outwardly to said rough reset preset position, then inwardly again to said rough size preset position and the outwardly to said rough reset preset position, cycling between said rough reset preset position and rough size preset position through a series of cycles, and controlling wheel feed to have said wheel similarly cycle between a finish reset preset position and a finish size preset position in a series of cycles and comprising an electrical pulse generator and means for selecting desired pulse speed rates therefrom to operate the said electric pulse motor as a function of a selected frequency of the applied pulses thereby producing a selected number of incremental wheel advance movements, means for counting pulses so processed and means for presetting said pulse counting means, f. electrical control means for operating said rocking bar means, g. electrical control means for operating said work support rotator, h. electrical control means for operating said work table drive, i. logic means interconnecting said pulse counter and electrical control means (f) (g) (h) to automatically cycle the work through rough grinding of all cam shapes on the work, then finish grinding and die-out grinding of all cams on the work, with each rough or finish grind proceeding until the pulse counter counts out the number of preset pulses for said rough or finish cycle, respectively, to provide thereby an open loop controlled rough and finish grinding wheel feed and work rotation, 2. The apparatus of claim 1 further comprising, manual operating controls for carrying out the steps of machine movement, said manual operating controls being operatively connected to said logic means to operate said counter and control means via said logic means, and manual/automatic switching means for selectively setting said logic means to selectively operate in manual and automatic modes.

3. The apparatus of claim 1 further comprising pick means for providing a small number of pulses for moving the wheel in small single increments of motion each time such pick means are actuated without changing the pulse count setting.

4. The apparatus of claim 3 wherein said pick means are manually actuatable.

5. The apparatus of claim 3 further comprising post grinding work size measuring means connected to said pick means and constructed and arranged to actuate same in response to variation from a preset reference size in the work to reduce such variation in the next grind.

6. The apparatus of claim 5 wherein said pick means are selectively manually actuatable.

7. The apparatus of claim 3 wherein said pick means are manually actuatable.

8. The apparatus of claim 1 further comprising post grinding work size measuring means for measuring finish work size and comparing work size to a preset reference size and providing a usable differential signal.

9. The apparatus of claim 7 wherein said means producing said differential signal are constructed and arranged to reset the zero finish size without disturbing the pulse feeding arrangement.

10. The apparatus of claim 8 in combination with automatic loading means.

11. The apparatus of claim 1 in combination with means for measuring operation of said step form output operator and generating a count of servo valve operations and comparing the same with the corresponding electrical pulse counts for coincidence within preset error limits, and means to stop wheel feed operation in response to a loss of synchronism between the original electrical and derivative mechanical pulses beyond said preset limit.

* * * * *